US008452079B2

(12) United States Patent
Tomita

(10) Patent No.: US 8,452,079 B2
(45) Date of Patent: May 28, 2013

(54) APPARATUS, METHOD, AND PROGRAM FOR PROCESSING IMAGE

(75) Inventor: Nobuyoshi Tomita, Kanagawa (JP)

(73) Assignee: Sony Corporation (JP)

( * ) Notice: Subject to any disclaimer, the term of this patent is extended or adjusted under 35 U.S.C. 154(b) by 880 days.

(21) Appl. No.: 12/583,163

(22) Filed: Aug. 14, 2009

(65) Prior Publication Data

US 2010/0046803 A1 Feb. 25, 2010

(30) Foreign Application Priority Data

Aug. 19, 2008 (JP) ................ P2008-210506

(51) Int. Cl.
*G06K 9/00* (2006.01)
(52) U.S. Cl.
USPC ....................................... 382/154
(58) Field of Classification Search
USPC ....................................... 382/154
See application file for complete search history.

(56) References Cited

U.S. PATENT DOCUMENTS

| | | | | |
|---|---|---|---|---|
| 6,009,190 A | * | 12/1999 | Szeliski et al. | 382/154 |
| 6,246,412 B1 | * | 6/2001 | Shum et al. | 345/419 |
| 6,549,650 B1 | * | 4/2003 | Ishikawa et al. | 382/154 |
| 2002/0126890 A1 | * | 9/2002 | Katayama et al. | 382/154 |

FOREIGN PATENT DOCUMENTS

| | | |
|---|---|---|
| JP | 2000032374 A | 1/2000 |
| JP | 2004048648 A | 2/2004 |
| JP | 2004094523 A | 3/2004 |
| JP | 2008-033613 A | 2/2008 |
| JP | 2009129183 A | 6/2009 |

OTHER PUBLICATIONS

Office Action from Japanese Application No. 2008-210506, dated May 25, 2010.
Office Action from Japanese Application No. 2008-210506, dated Aug. 10, 2010.

\* cited by examiner

*Primary Examiner* — Alex Liew
(74) *Attorney, Agent, or Firm* — Lerner, David, Littenberg, Krumholz & Mentlik, LLP

(57) ABSTRACT

A reference image and a synthesis image covering an area outside the viewfield of the reference image are synthesized as one piece of display image data in a manner reflecting the positional relationship of the images at the image capturing. The display image data is displayed with a partial area thereof presented on a display screen, and the partial area is moved in response to a shift instruction.

2 Claims, 19 Drawing Sheets

APPARATUS, METHOD, AND PROGRAM FOR PROCESSING IMAGE

CROSS-REFERENCE TO RELATED APPLICATION

The present application claims priority from Japanese Patent Application No. JP 2008-210506 filed in the Japanese Patent Office on Aug. 19, 2008, the entire content of which is incorporated herein by reference.

BACKGROUND OF THE INVENTION

1. Field of the Invention

The present invention relates to an apparatus and method for processing image data. The present invention also relates to a computer program for causing the image processing apparatus to perform the method of processing image.

2. Description of the Related Art

Position information representing a position of an image capturing device at image capturing may be attached to captured image data.

For example, Japanese Unexamined Patent Application Publication No. 2008-33613 discloses a technique that presents information regarding a landmark close to or at the position information when the position information is checked against geographical information.

SUMMARY OF THE INVENTION

It is thus desirable to provide an image processing apparatus that attaches the position information to the captured image data and presents high entertainment quality and usefulness taking advantage of the attached position information.

In accordance with one embodiment of the present invention, an image processing apparatus, includes viewpoint range setting means for setting a viewpoint range based on position information of reference image data selected as a reference from captured image data, the captured image data containing at least position information representing a capturing position and direction information representing a capturing direction attached thereto as additional information, synthesis image data acquisition means for acquiring from a storage storing the captured image data with the position information and the direction information attached thereto as the additional information, as synthesis image data, captured image data containing the position information and the direction information, the position information and the direction information satisfying a condition that an image outside an imaging frame of the reference image data is captured with a viewpoint position within the viewpoint range, display image generating means for generating display image data by placing and synthesizing a reference image from the reference image data and a synthesis image from the synthesis image data at a position set in accordance with the position information and the direction information, and display control means for causing a partial area of the display image data to be displayed on a display screen and causing the partial area of the display image data displayed heretofore to be modified in response to a shift direction specified in a shift instruction of a display area.

With the above-described arrangement, the reference image captured within a given field of view and the synthesis image captured outside the field of view of the reference image are synthesized as one piece of display image data in a state that reflects the positional relationship of the images at in the image capturing. When the display image data is displayed, the partial area is displayed on the display screen and then moved in response to the shift instruction.

A captured image serving as a reference and an image surrounding the captured image are collected, and then displayed in a realism-oriented manner. The quality of entertainment and user-friendliness are thus enhanced in viewing the captured image.

DESCRIPTION OF THE PREFERRED EMBODIMENTS

The embodiments of the present invention are described below.

Figure 1:
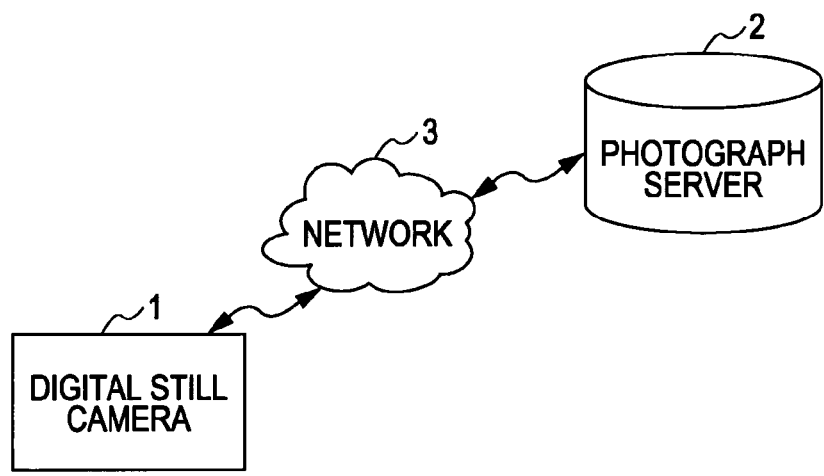
FIG. 1 illustrates a first example of an image processing system in accordance with one embodiment of the present invention.

FIG. 1 illustrates a first example of an image processing system in accordance with one embodiment of the present invention.

In the image processing system, a digital still camera 1 and a photograph server 2 are connected to each other via a network 3 in a communicable way.

Figure 2:
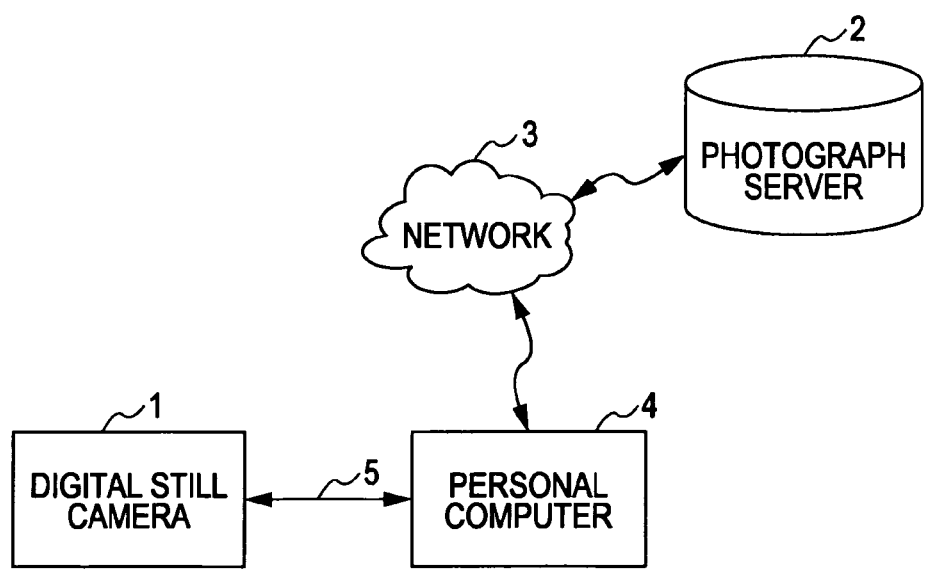
FIG. 2 illustrates a second example of the image processing system in accordance with one embodiment of the present invention.

FIG. 2 illustrates a second example of the image processing apparatus in accordance with one embodiment of the present invention.

Referring to FIG. 2, the digital still camera 1 is connected to a personal computer 4 via a data interface 5. The data interface 5 may be of wireless or wired type.

The personal computer 4 is connected to the photograph server 2 via the network 3. More specifically, the digital still camera 1 is connected to the photograph server 2 using a network communication function of the network 3. In the first example of FIG. 1, the digital still camera 1 itself has a network communication function. In the second example of FIG. 2, the digital still camera 1 does not have the network communication function.

In a modification to the second example of the system, a combination of the digital still camera 1 and a peripheral device, called a cradle, supporting the digital still camera 1 may be contemplated. If the digital still camera 1 is mounted on the cradle, the cradle and the digital still camera 1 may be connected to each other via a wireless or wired data interface. The cradle itself may be furnished with the network connection function.

Figure 3:
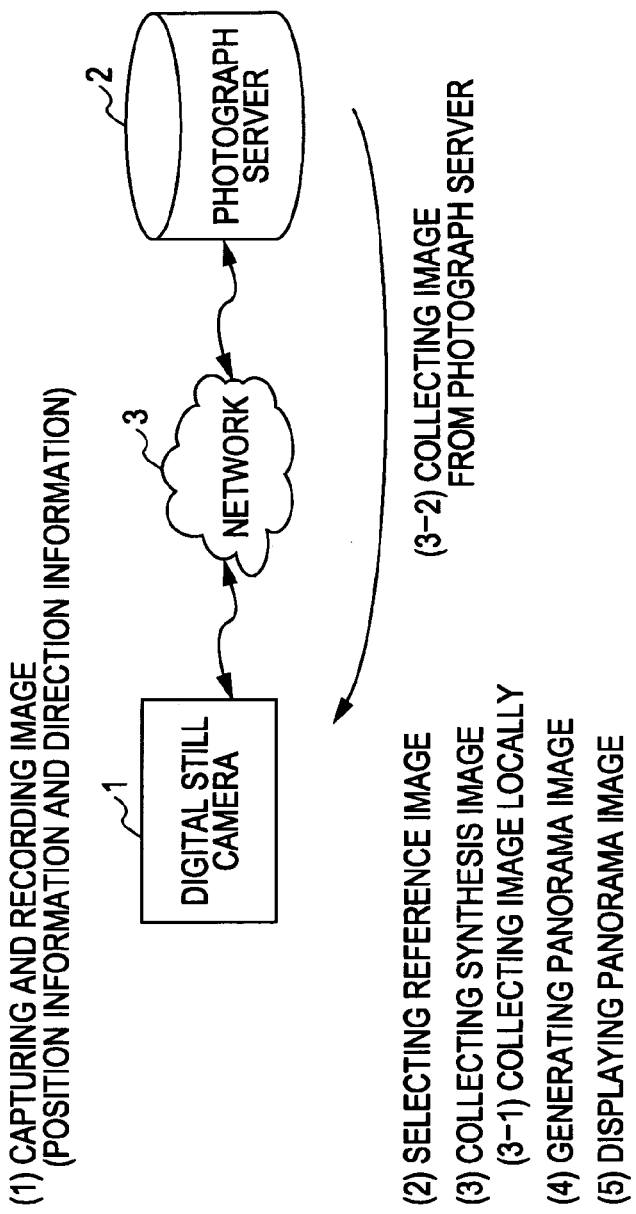
FIG. 3 illustrates an operation of the image processing system in accordance with one embodiment of the present invention.

Referring to FIG. 3, operation of the image processing systems illustrated in FIGS. 1 and 2 is briefly described. The first example illustrated in FIG. 1 is described. The discussion of the first example is made referring to parenthesized numbers in FIG. 3.

A user holding the digital still camera 1 captures images using the digital still camera 1. Image data obtained through image capturing (captured image data) is stored onto a recording medium, loaded on the digital still camera 1 (memory card 30), in a predetermined file format such as Joint Photographic Experts Group (JPEG). A file as the captured image data is referred to as a captured image file.

The captured image file is accompanied by metadata (additional information). The metadata contains information regarding the date of image capturing, and camera control information such as exposure at the image capturing, as standardized by Exchangeable Image File Format (Exif). In accordance with the present embodiment, the metadata contains position information representing a position of the digital still camera 1 at the image capturing, and direction information representing a direction in which the digital still camera 1 has looked during the image capturing.

The digital still camera 1 of the present embodiment displays a panorama image based on images of a plurality of captured image files in a mode described later. The user may wish display a panorama image. The user then selects the captured image data serving as a reference for the panorama image of the digital still camera 1. The captured image data serving as a reference is hereinafter referred to as a "reference image."

With the reference image selected, the user operates the digital still camera 1 in order to issue an instruction to display the panorama image. In response to the instruction, the digital still camera 1 collects other captured image data used to form the panorama image (hereinafter referred to as a "synthesis image") in addition to the reference image. Step (3-1) is performed. If a captured image file satisfying a condition as a synthesis image is not collected, step (3-2) is performed.

In step (3-1), the digital still camera 1 locally searches for images for collection. More specifically, the digital still camera 1 searches the captured image files stored on a memory card loaded thereon for one satisfying the condition as a synthesis image.

If the digital still camera 1 does not acquire any captured image file satisfying the condition as the synthesis image in local searching, the digital still camera 1 then accesses the photograph server 2 via the network 3.

The photograph server 2 stores and manages a large number of captured image files uploaded from numerous users via the network 3. It is noted that the captured image file stored and managed by the photograph server 2 also contains the position information and direction information as the metadata.

The digital still camera 1 then accesses and requests the photograph server 2 to perform a search operation by specifying a search condition corresponding to the condition as the synthesis image. In response to the request, the photograph server 2 searches for the captured image file satisfying the search condition from the captured image files stored and managed by the photograph server 2, and transmits a hit captured image file. The digital still camera 1 can collect the synthesis image from the photograph server 2 via the network 3 in this way.

In the collection step for the synthesis image in step (3), the digital still camera 1 may collect the captured image file from the photograph server 2 only as in step (3-2) or may collect the captured image file locally only in step (3-1).

If the local collection of the synthesis image is performed, no particular network connection function is necessary. This operation is handy and completed for a short period of time. If the synthesis image is locally collected, it is likely that the captured image file taken at the image capturing and recording of the reference image is hit. It is also likely that camera settings related to surrounding environment during the image capturing and recording are commonly shared. This means less chance that the user is under odd impression on synthesis results.

On the other hand, the photograph server 2 stores a large number of captured image files. If the captured image file is collected from the photograph server 2, it is highly likely that the captured image file satisfying the condition as the synthesis image is acquired.

In accordance with the present embodiment, the captured image files are collected locally and from the photograph server 2 to enjoy the advantages of the two cases. The local image collection is performed first.

The digital still camera 1 collects all the necessary synthesis images and uses the collected synthesis images. The digital still camera 1 then generates display panorama image data for use on a display screen 23A of a display 23 in the digital still camera 1.

Using the display panorama image data, the digital still camera 1 causes the display screen 23A to display the panorama image.

Figure 4:
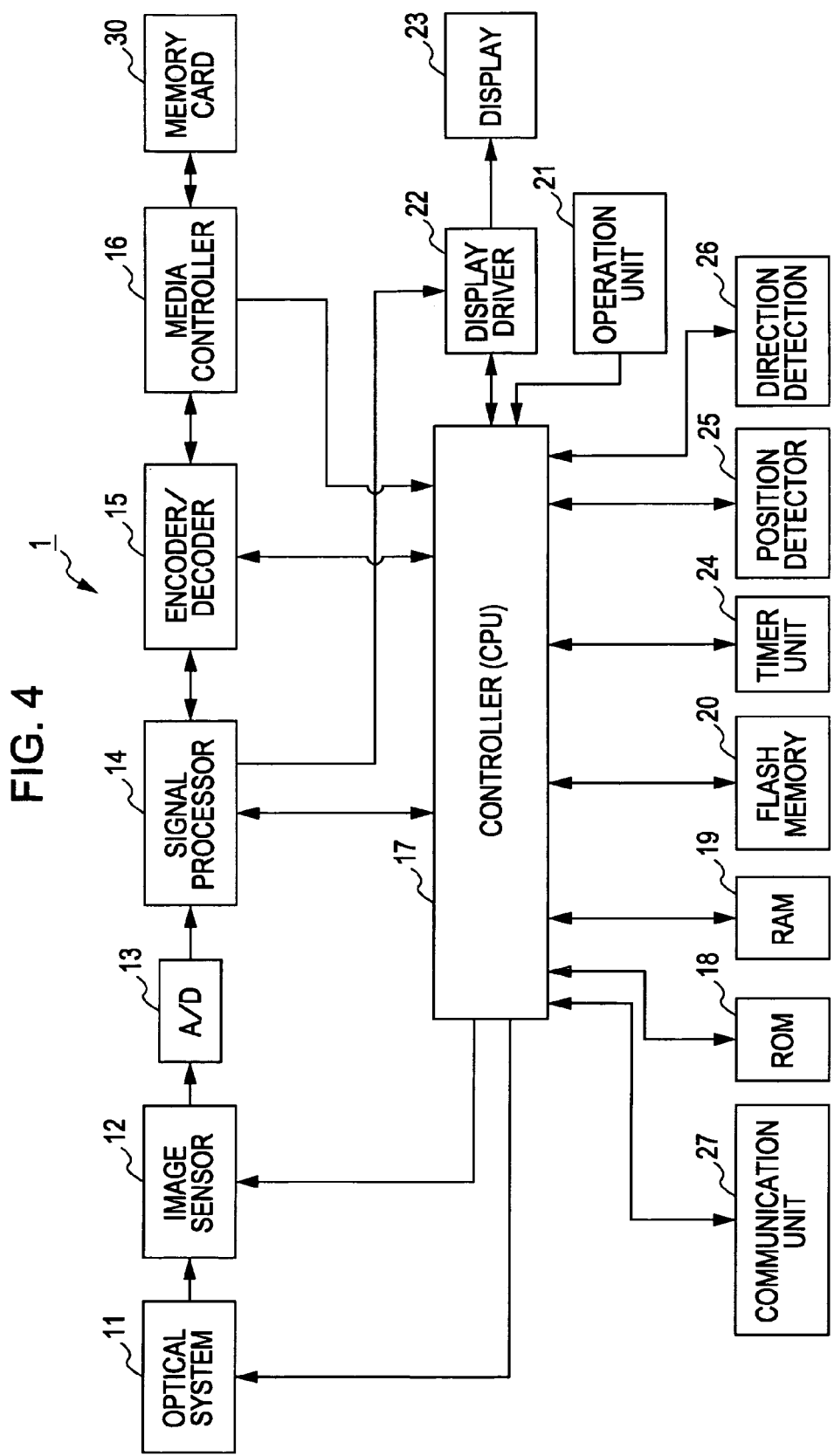
FIG. 4 illustrates a structure of a digital still camera.

FIG. 4 is a block diagram illustrating a structure of the digital still camera 1 of one embodiment of the present invention.

An optical system 11, including an imaging lens group composed of several lenses such a zoom lens, and a focusing lens, and an aperture diaphragm, receives an incident light beam as an image beam and causes the incident light beam to be focused on a light receiving surface of an image sensor 12.

The optical system 11 also includes drive mechanisms for driving the zoom lens, the focusing lens, the aperture diaphragm, etc. These mechanisms are controlled in control operations executed by a controller 17, including a zoom (angle of view) control operation, an auto focus control operation, and an auto exposure operation.

The image sensor 12 performs a photoelectric conversion converting an imaging light beam from the optical system 11 into an electric signal. The image sensor 12 receives the imaging light beam from the optical system 11 on the light receiving surface of a photoelectric conversion device thereof, and successively outputs a signal charge accumulated in response to the light intensity of the received light beam at a predetermined timing. The electric signal responsive to the image light beam (captured image signal) is thus output.

The image sensor 12 as a photoelectric converter (imaging device) is not limited to any particular type. For example, the image sensor 12 may be a complementary metal oxide semiconductor (CMOS) sensor or a charge-coupled device (CCD). The CMOS sensor, if used as the image sensor 12, may contain an analog-to-digital (A/D) converter corresponding to an A/D converter 13 in the structure of the digital still camera 1.

A captured image signal output from the image sensor 12 is input to the A/D converter 13 to be converted into a digital signal. The digital signal is then input to the signal processor 14.

The signal processor 14 acquires the digital captured image signal output from the A/D converter 13 by unit corresponding to one still image (frame image). The signal processor 14 performs a predetermined signal process on the captured image signal acquired by still image unit, thereby generating captured image data as image signal data corresponding to one still image.

If the captured image data generated by the signal processor 14 is recorded onto the memory card 30 as a recording medium, the captured image data corresponding to one still image is output from the signal processor 14 to an encoder/decoder 15.

The encoder/decoder 15 compression encodes the captured image data by still image unit output from the signal processor 14 in accordance with a predetermined still image compression encoding method. The encoder/decoder 15 under the control of the controller 17 adds a header to the captured image data, thereby converting the captured image data into the captured image data compressed in the predetermined method. An image file in a predetermined still image format having the captured image data thus generated as data body is generated. The image file is then transferred to the media controller 16. The media controller 16 under the control of the controller 17 writes data of the transferred image file onto the memory card 30.

The memory card 30 has a card shape defined in a predetermined standard, and contains a non-volatile semiconductor memory such as a flash memory.

The captured image data recorded onto the memory card 30 is managed by file. The management by file is implemented by a file system mounted on a host of the memory card 30.

The recording medium storing the image file may be a disc-like recording medium, or any other type of recording medium of different type and different shape.

Using the captured image data provided by the signal processor 14, the digital still camera 1 causes the display 23 to display an image. The digital still camera 1 thus displays a currently captured image or a through-image. As described above, the signal processor 14 acquires the captured signal from the A/D converter 13, and generates the captured image data corresponding to one still image. By repeating this operation, the digital still camera 1 successively generates the captured image data corresponding to a frame image of a moving image. Under the control of the controller 17, the captured image data thus successively generated is transferred to a display driver 22.

The display driver 22 generates a drive signal driving the display 23, in response to the captured image data supplied from the signal processor 14, and outputs the drive signal to the display 23. The display 23 successively displays images responsive to the captured image data by still image unit. The images captured are displayed as a moving image on the display 23 to the user. The through-image is thus displayed.

The digital still camera 1 also can reproduce an image file recorded on the memory card 30 and causes the display 23 to display an image.

To this end, by specifying an image file, the controller 17 issues a data read instruction to the media controller 16 to read data from the memory card 30. In response to the instruction, the media controller 16 accesses an address on the memory card 30 recording the specified image file, reads the data, and then transfers the read data to the encoder/decoder 15.

Under the control of the controller 17, the encoder/decoder 15 extracts a data body as the compressed still image data from the image file transferred from the media controller 16, performs on the compressed still image data a decoding process corresponding to the compression encoding process, and obtains image data corresponding to one still image. The image data is then transferred to the display driver 22. The display 23 in this way reproduces and displays the image of the image file stored on the memory card 30.

The display 23 can display a user interface image together with the through-image and the reproduced image of the image file. For example, the controller 17 generates display image data as a user interface image in response to an operational status at the moment, and then outputs the display image data to the display driver 22. The display 23 displays the user interface image.

The user interface image, such as a particular menu screen, may be displayed on the display screen 23A of the display 23 separate from the through-image and the reproduced image of the captured image data. Alternatively, the user interface image may be partially superimposed on the through-image and the reproduced image of the captured image data.

In accordance with the present embodiment, the panorama image can be displayed on the display screen 23A of the display 23 as illustrated in FIG. 3.

The controller 17 includes a central processing unit (CPU), and forms a microcomputer together with an read-only memory (ROM) 18 and a random-access memory (RAM) 19. The ROM 18 stores in addition to a program to be executed by the CPU a variety of setting information related to the operation of the digital still camera 1.

The RAM 19 serves as the main memory for the CPU.

A flash memory 20 is arranged as a non-volatile memory that stores a variety of setting information to be updated in response to a user operation or operation history.

If a non-volatile memory such as a flash memory is used for the ROM 18, part of the ROM 18 can serve as the flash memory 20.

An operation unit 21 includes a variety of controls for the digital still camera 1 and an operation information signal output section for generating an operation information signal in response to operation of each of the controls and outputting the operation information signal to the CPU. The operation unit 21 includes a touchpanel structure arranged on a panel of the display screen of the display 23.

The controller 17 executes a predetermined process in response to the operation information signal input from the operation unit 21.

A timer unit 24 is a timer section measuring the present time, the day, the month, and the year.

A position detector 25 detects the position of the digital still camera 1 and outputs position information. A Global Positioning System (GPS) receiver or GPS position fixing device may be used for the position detector 25. If the GPS system is used, the position information is available as latitude/longitude information.

A direction detector 26 detects a capturing direction in which the digital still camera 1 captures images, and outputs direction information. The capturing direction is referenced with respect to the optical axis of the imaging lens group of the optical system 11. The direction information corresponding to the capturing direction is information related to bearing, and elevation and depression angles. A gyro sensor may be used for the direction detector 26.

A communication unit 27 may include a communication section for communications with a network, and a communication section for communications with a data interface defined by a predetermined standard such as the Institute of Electrical and Electronics Engineers (IEEE) 1394 and Universal Serial Bus (USB).

Figure 5:
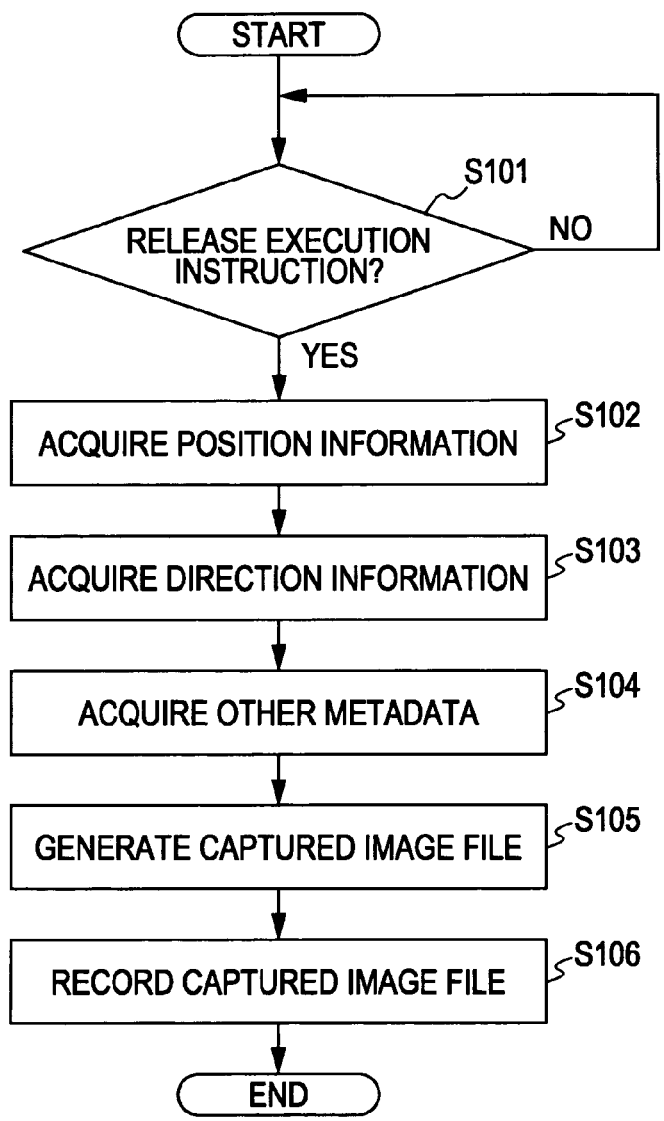
FIG. 5 is a flowchart illustrating a process of recording an image file captured by the digital still camera.

A process of the digital still camera 1 thus constructed for recording a captured image file is described below with reference to a flowchart of FIG. 5.

In step S101, the digital still camera 1 in an image capturing and recording mode waits on standby for a release execution instruction. The release execution instruction is issued to record a captured image data. The release execution instruction is issued in response to a shutter button operation or at the moment a predetermined timer time has elapsed in a self-timer. In response to the release execution instruction, the digital still camera 1 proceeds to step S102.

In step S102, the digital still camera 1 acquires the position information from the position detector 25. The position information represents the position of the digital still camera 1 at the moment the release execution instruction is issued, i.e., at the moment of recording of the current captured image file.

In step S103, the digital still camera 1 acquires the direction information from the direction detector 26. The direction information represents the capturing direction (bearing and elevation and depression angles) at the moment the release execution instruction is issued, i.e., at the moment of recording of the current captured image file.

In step S104, the metadata other than the position information and direction information is acquired. The metadata acquired includes date and time information related to the image capturing date and time, and a variety of camera control information, etc.

In step S105, a captured image file in the predetermined format is generated based on the still image data extracted from the captured image signal at the timing of the release execution instruction and the metadata acquired in steps S102-S104.

In step S106, the captured image file generated in step S105 is written onto the memory card 30 for storage.

Figure 6:
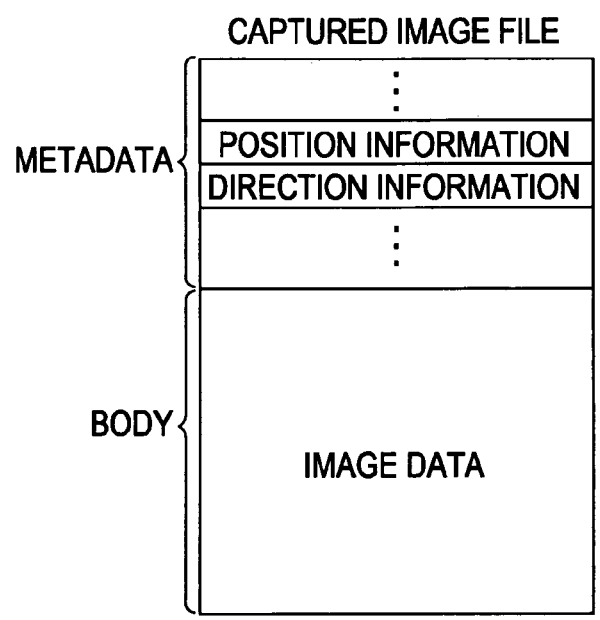
FIG. 6 illustrates a structure of the captured image file.

FIG. 6 diagrammatically illustrates a structure of the captured image file generated in step S105 and recorded in step S106.

The captured image file illustrated in FIG. 6 is composed of metadata and a body. The metadata corresponds to a region called a header. In accordance with the present embodiment, the position information and the direction information acquired in steps S102 and S103 is contained in the metadata.

The still image data generated from the captured image signal at the issue timing of the release execution instruction is contained in the body.

Figure 7:
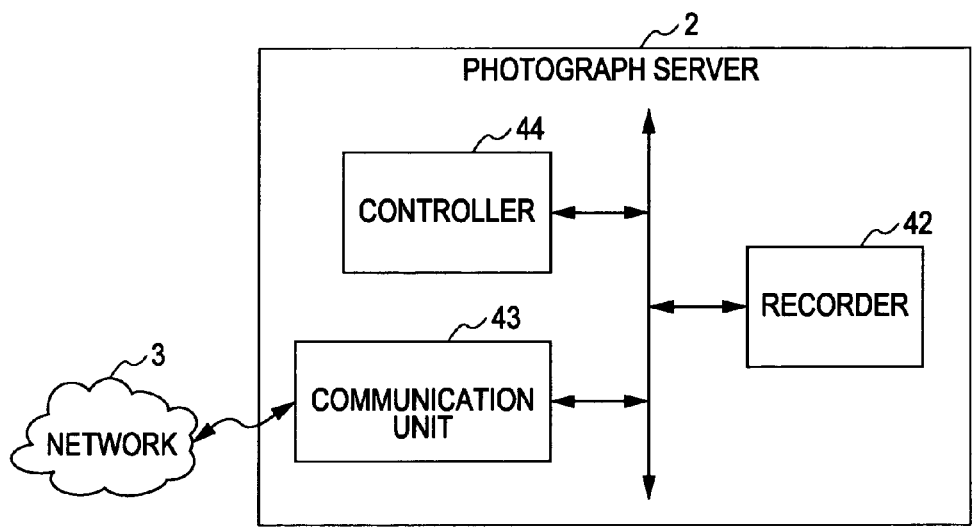
FIG. 7 illustrates a structure of a photograph server.

FIG. 7 illustrates a structure of the photograph server 2. The photograph server 2 is constructed as a server-based computer system. The photograph server 2 includes a controller 44, a storage 42, and a network 3.

The controller 44 executes a variety of control operations and processes of the photograph server 2.

The storage 42 stores a (captured) image file uploaded via the network 3.

The communication unit 43 supports communications via the network 3.

If an image file is uploaded from a terminal via the network 3, the photograph server 2 receives and acquires an image file at the communication unit 43.

The controller 44 transfers the received image file to the storage 42 for storage, and the storage 42 stores the image file as a database.

When a search request is issued to the photograph server 2 via the network 3, the communication unit 43 in the photograph server 2 receives the search request and transfers the received search request to the controller 44.

The controller 44 searches the storage 42 for an image file in response to a search condition indicated by the received search request, and extracts a hit image file satisfying the search condition. Data of the extracted image file is then transmitted to the search request source.

A first display mode of the panorama image displayed by the digital still camera 1 of the present embodiment is described below.

Figure 8A:
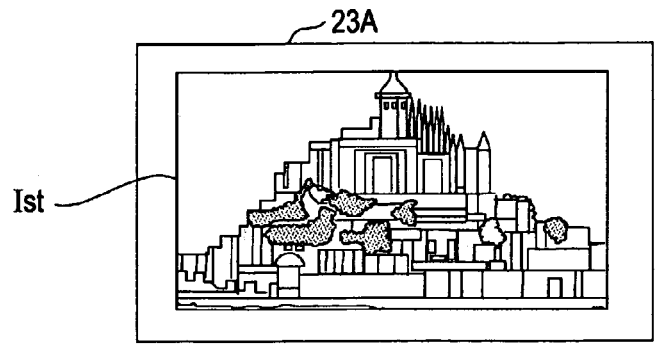
FIGS. 8A-8C diagrammatically illustrate a first display mode of a panorama image in accordance with one embodiment of the present invention.

FIG. 8A illustrates a reference image Ist selected by the user on the display screen 23A of the display 23. The panorama image in the first display mode is displayed with respect to the reference image Ist as a reference. The display image data (display panorama image data) is generated based on the concept illustrated in FIG. 8B.

Figure 8B:
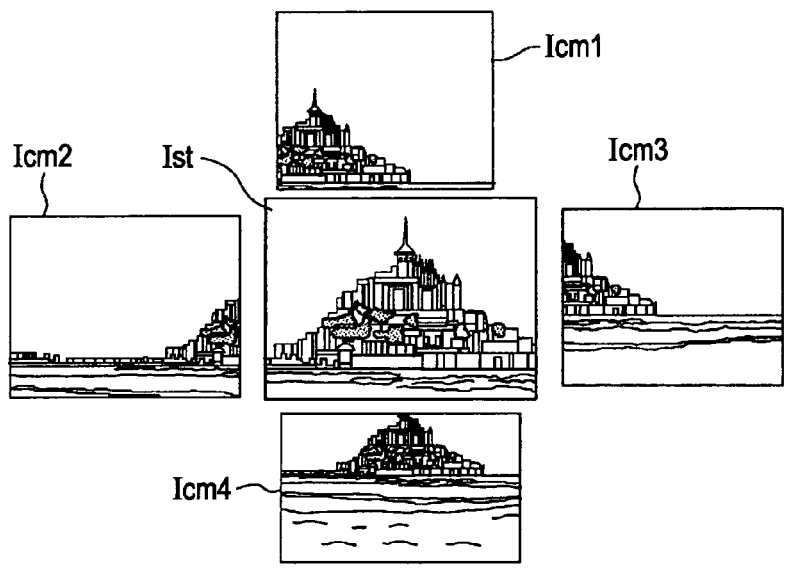

Synthesis images are arranged two-dimensionally around the reference image Ist as illustrated in FIG. 8B. The synthesis image Icm1 is arranged above the reference image Ist. The synthesis image Icm2 is arranged to the left of the reference image Ist. The synthesis image Icm3 is arranged to the right of the reference image Ist. The synthesis image Icm4 is arranged below the reference image Ist. The synthesis image Icm1 covers a field slightly above the reference image Ist. The synthesis image Icm2 covers a field slightly left to the reference image Ist. The synthesis image Icm3 covers a field slightly right to the reference image Ist. The synthesis image Icm4 covers a field slightly below the reference image Ist.

As conceptually illustrated in FIGS. 8A-8C, the synthesis images Icm2-Icm4 are captured surrounding the reference image Ist in close image capturing directions shifted slightly from a direction in which the reference image Ist is captured from one viewpoint position P (actually having some degree of spread as will be described later). The synthesis images Icm2-Icm4 are then arranged in directions approximately reflecting the image capturing directions thereof. This arrangement suggests that the synthesis image is considered as an image that has an image content out of the range of the image frame of the reference image Ist. The image frame is interpreted as a field of view of the digital still camera 1 in which the reference image Ist is captured.

The synthesis images are four synthesis images Icm1-Icm4. In practice, a larger number of synthesis images captured within a predetermined field of view are arranged.

Figure 8C:
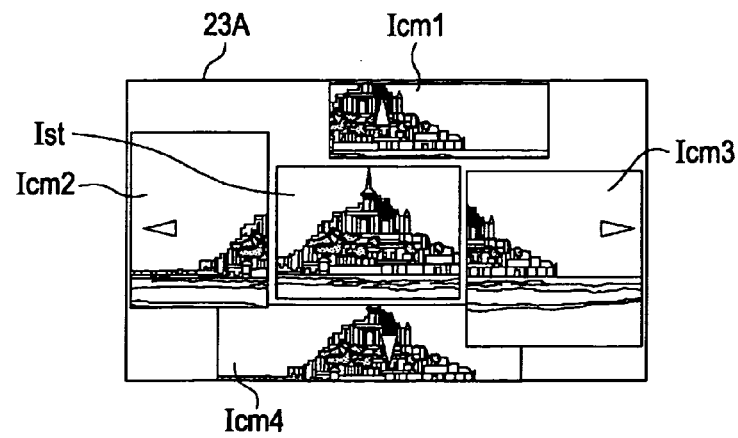
Figure 9:
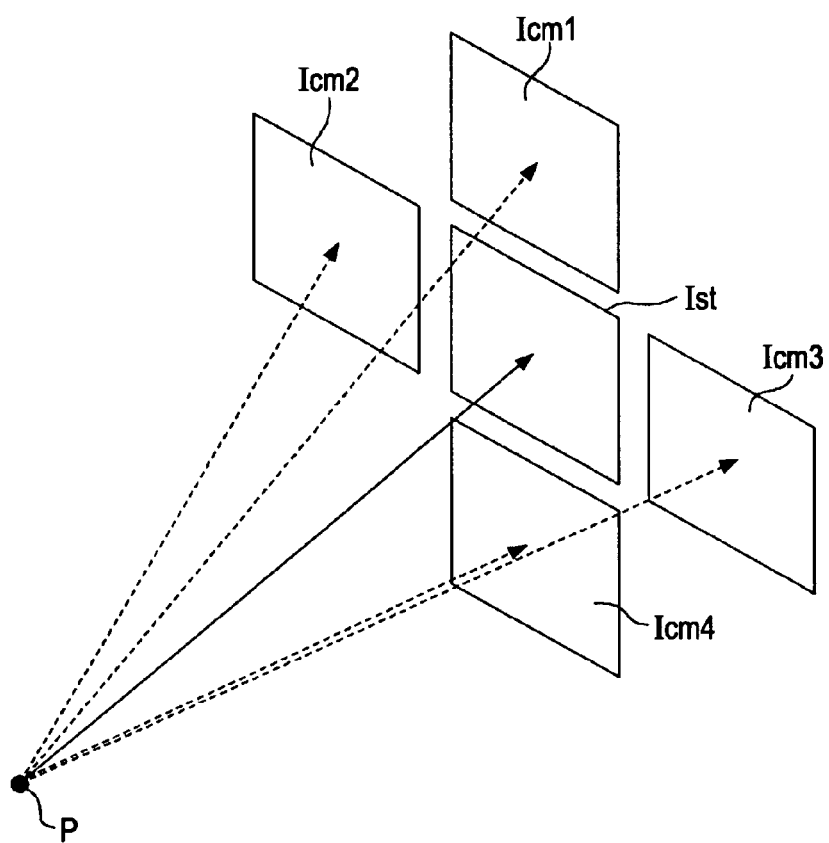
FIG. 9 illustrates the relationship between a reference image and synthesis images in the panorama image.

The display image data generated from the reference image Ist and the synthesis images Icm arranged as illustrated in FIG. 8B is displayed on the display screen 23A as illustrated in FIG. 8C.

As illustrated in FIG. 8B, the synthesis images Icm are regularly arranged surrounding the reference image Ist with the capturing directions approximately taken into consideration. When displayed as illustrated in FIG. 8C, the synthesis images Icm are aligned with the reference image Ist with horizontal and vertical positions adjusted. When the display panorama image data is generated, the relative positions of the images are also adjusted. In this way, a panorama image, when displayed, is easy to view.

Referring to FIG. 8C, the panorama image is displayed on the display screen 23A based on the display panorama image data.

The panorama image illustrated in FIG. 8C has an image content when displaying starts. A cursor CR is placed on the reference image Ist. An operation may be performed on the panorama image to shift a display area up, down, right and left. This operation is performed on the operation unit 21. For example, keys for up, down, right and left shift operations may be arranged. Alternatively, touchpanel operations may be performed on the display screen 23A.

For example, if a left shift operation is performed on the panorama image on the display screen 23A, the cursor CR is placed on the image immediately left to the reference image Ist and that image then shifts to an approximate center. Similarly, if right, up, or down shift operation is performed, the cursor CR is placed at the next image in the instructed direction, and the next image is then shifted to an approximate center.

The display area in the panorama image is shifted stepwise in response to the shift instruction in up, down, left, and right directions. The entire panorama image diagrammatically illustrated in FIG. 8B can be viewed in this way.

A second display mode is described with reference to FIGS. 10A-10C and FIGS. 11A and 11B.

Figure 10A:
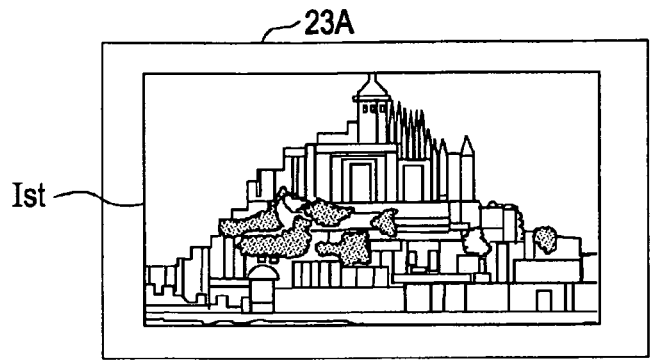
FIGS. 10A-10C diagrammatically illustrate a second display mode of the panorama image in accordance with one embodiment of the present invention.

As FIG. 8A, FIG. 10A illustrates the reference image Ist selected and displayed on the display screen 23A. The images in the second display mode is also synthesized to generate the display panorama image data as conceptually illustrated in FIG. 10B.

In the first display mode, the synthesis images Icm are arranged surrounding the reference image Ist in the positions thereof reflecting the image capturing directions thereof.

In contrast, in the second display mode, the synthesis images Icm are arranged so that each of the synthesis images Icm is concatenated to the reference image Ist. More specifically, the synthesis images Icm are concatenated to the reference image Ist serving as a core image in image synthesis. One piece of display panorama image data is thus generated.

Figure 11A:
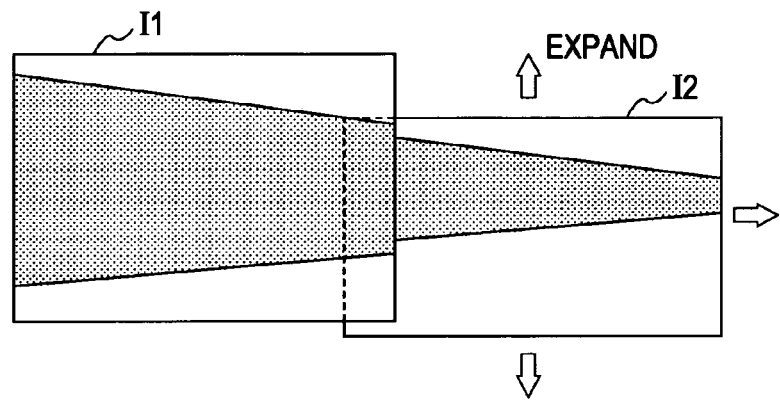
FIGS. 11A and 11B diagrammatically illustrate an adjustment method of a size of a subject on an image on the second display mode.
Figure 11B:
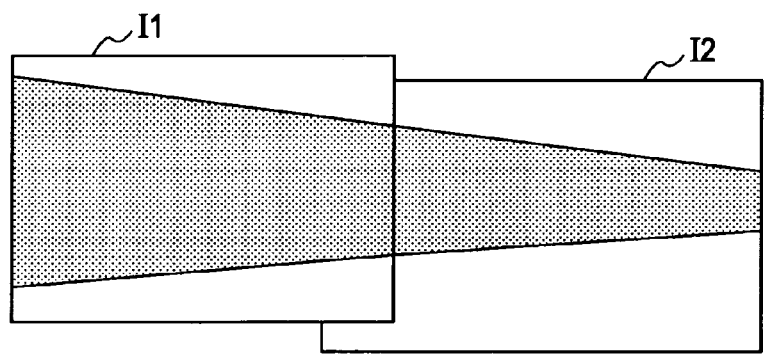

During image synthesis, adjacent images 11 and 12 may be different in subject size as illustrated in FIG. 11A. In such a case, the image 12 may be expanded (or the image 11 may be contracted) as illustrated in FIG. 11B so that the edges of the subjects are continuous to each other. This arrangement corrects a difference in subject size on the images due to subject distance between the images (the reference image Ist and the synthesis images Icm).

Figure 10B:
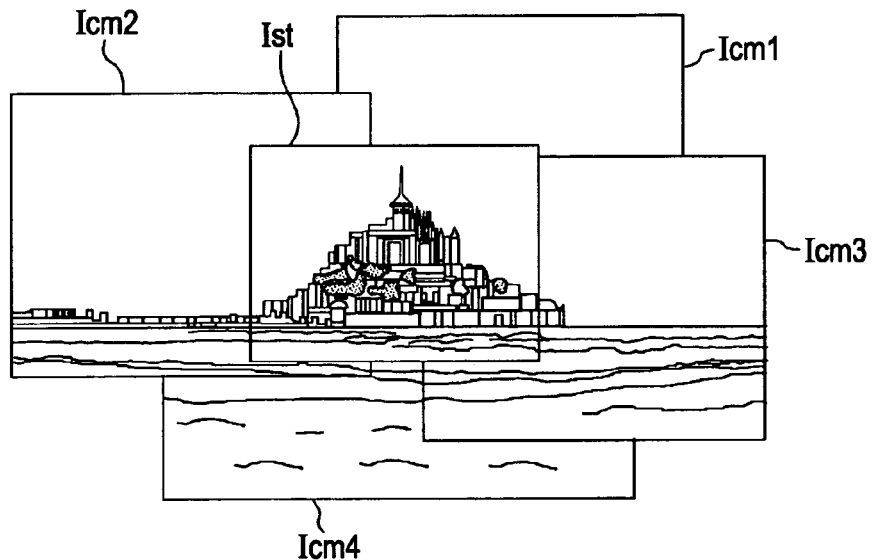
Figure 10C:
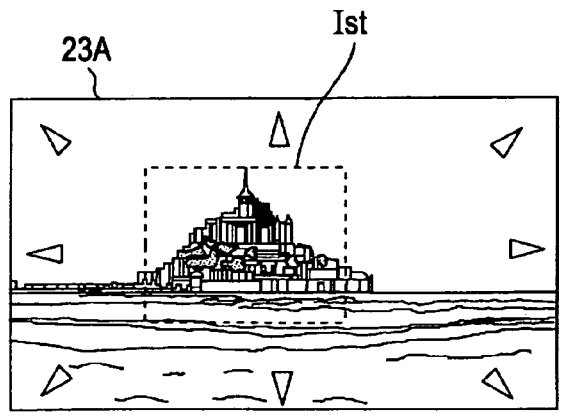

Referring to FIG. 10C, the panorama image is displayed on the display screen 23A based on the display panorama image data thus constructed. Eight shift instructions in up, down, left, right, slant upward left, slant upward right, slant downward left, and slant downward right are possible. In the direction instructed in operation, the panorama image is continuously scrolled and then displayed.

In a viewer function of a generally available digital still camera in the related art, a plurality of captured image files are viewed one by one with a forward operation or a backward operation performed, or thumbnail images arranged in a matrix of horizontal rows and vertical columns are viewed in a predetermined order.

Captured image files (synthesis images) may be collected and acquired with respect to the reference image Ist as described with reference to FIG. 3. If the acquired images are viewed with the viewer function of the related art, a sufficient level of realism may not be achieved.

In contrast, the panorama image resulting from synthesizing a combination of the reference image Ist and the synthesis image Icm is displayed as in one of the first display mode and the second display mode of the present embodiment. A high standard of realism is achieved and the quality of entertainment is increased accordingly. In particular, if the synthesis image of the captured image file collected from the photograph server 2 is used, an image not expected by the user may be synthesized. It is likely that a scene surprising to the user is produced. The quality of entertainment is enhanced.

An image processing method for displaying the panorama image in accordance with the present embodiment is specifically described. The image processing based on the first display mode illustrated in FIGS. 8A-8C is described.

Figure 12:
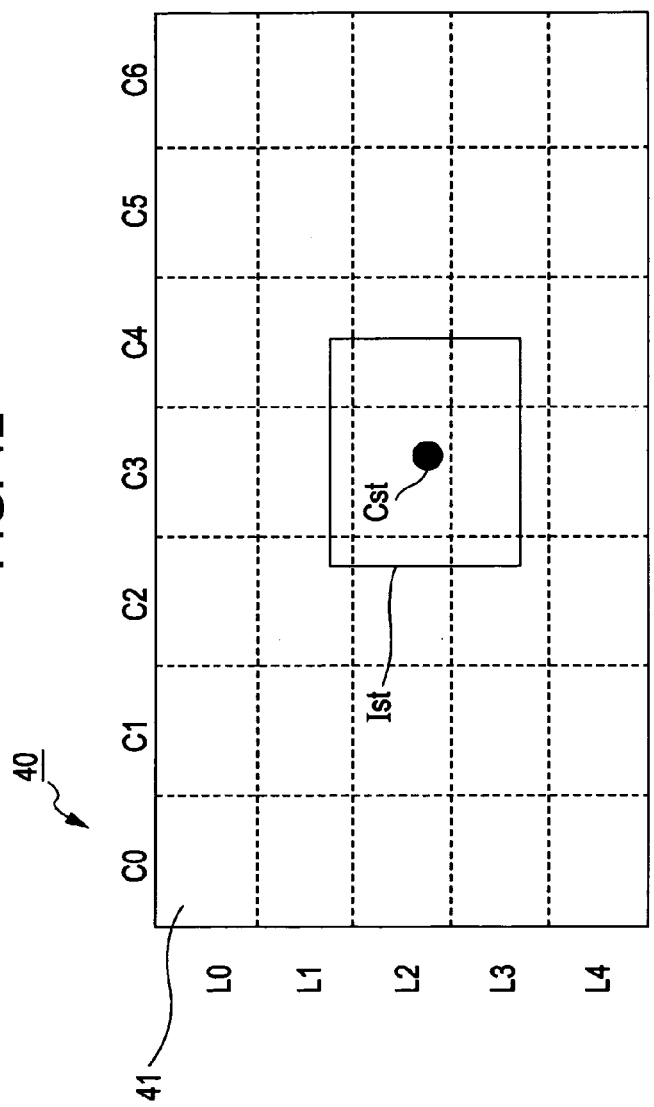
FIG. 12 diagrammatically illustrates an example of a canvas defined for panorama image display and a plotting process of plotting the reference image on the canvas in accordance with one embodiment of the present invention.

When the reference image Ist and the synthesis image Icm are synthesized in accordance with the present embodiment, a canvas (virtual image placement surface) 40 illustrated in FIG. 12 is defined and set.

The canvas 40 may be a virtual board on which the reference image Ist and the synthesis image Icm are glued.

The canvas 40 is partitioned into blocks as denoted by broken lines, each block (placement area) 41 having predetermined horizontal and horizontal dimensions. Here, the canvas 40 is partitioned into 35 blocks 41 of five rows by seven columns. The matrix of blocks 41 include L0-L4 rows from top to bottom and C0-C6 columns from left to right.

The number of blocks and matrix of blocks are determined only for convenience of displaying. In practice, the number of blocks and matrix of blocks may be different from those in FIG. 12.

A center point Cst as the center of gravity of the image of the reference image Ist (for example, a crossing point of diagonal lines of a rectangular shape of an image frame) is placed (plotted) in center block (L2,C3). The center block (L2,C3) is central in both the vertical direction and the horizontal direction. The position at which the reference image Ist is plotted on the canvas 40 is thus determined.

Figure 13:
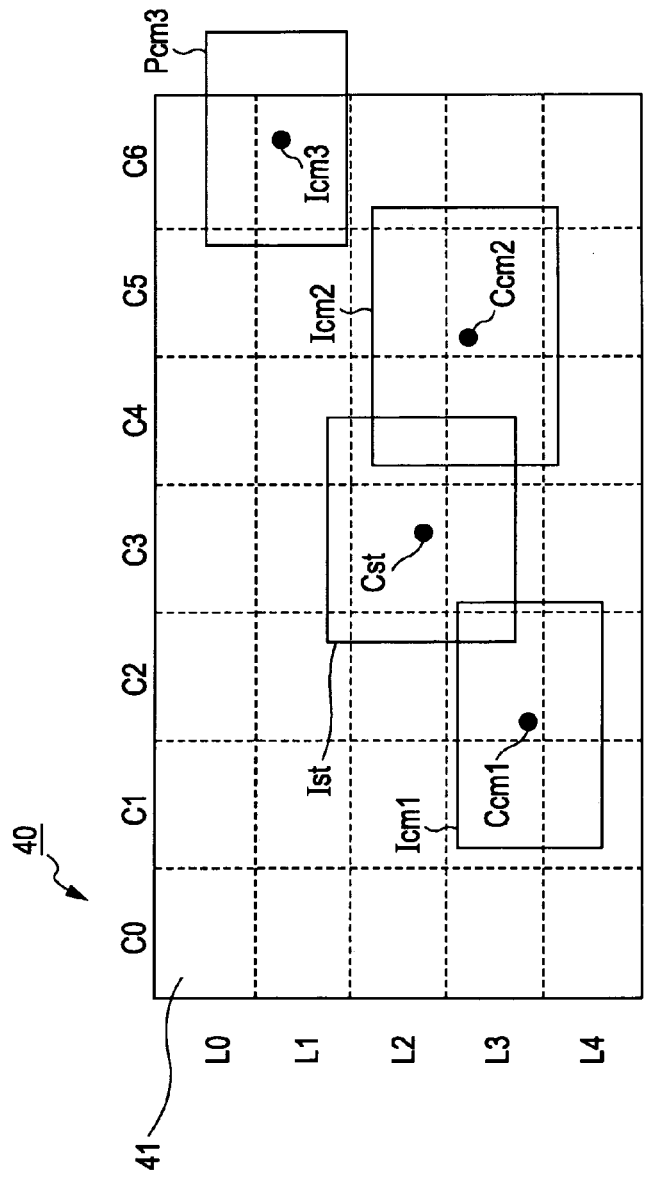
FIG. 13 diagrammatically illustrates an example of a canvas defined for panorama image display and a plotting process of plotting the synthesis images on the canvas in accordance with one embodiment of the present invention.

Referring to FIG. 13, the center point of each of the synthesis images Icm is plotted in each of the remaining blocks. As illustrated in FIG. 13, the center point Ccm1 of the synthesis image Icm1 is plotted in the block (L3,C2), the center point Ccm2 of the synthesis image Icm2 is plotted in the block (L3,C5), and the center point Ccm3 of the synthesis image Icm3 is plotted in the block (L1,C6). Similarly, one synthesis image Icm is plotted in each block until the center points Ccm of the synthesis images Icm are plotted in all the blocks. In this way, the plotting positions of the center points Cst and Ccm of one reference image Ist and 34 synthesis images Icm are thus determined.

When all the necessary center points are plotted on the canvas 40, image processing is performed so that the reference image and the synthesis images are glued with respect to the center points. As illustrated in FIG. 8C, the display panorama image data is generated.

The relationship between an image (captured image file) to be plotted in the canvas 40 and the position information and direction information is described with reference to FIGS. 14A and 14B.

Figure 14A:
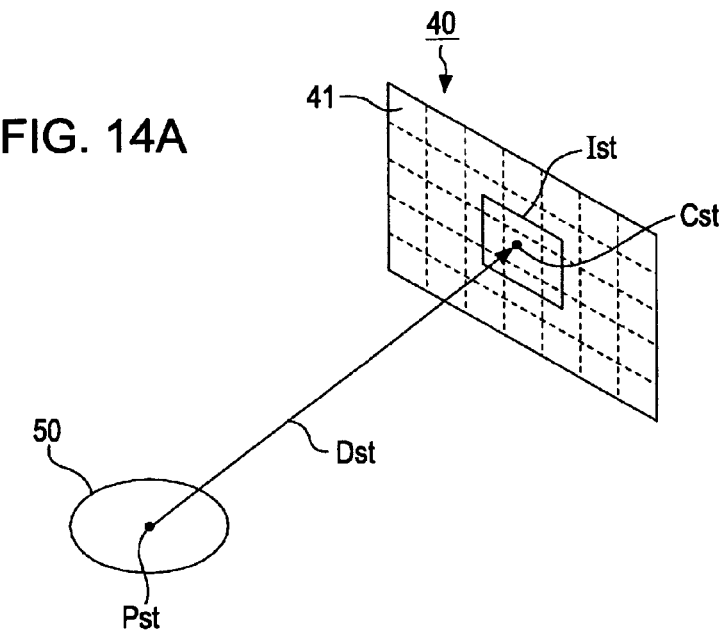
FIGS. 14A and 14B illustrate the relationship between the canvas and a viewpoint range.

FIG. 14A corresponds to FIG. 12. More specifically, only the reference image Ist is plotted on the canvas 40.

In accordance with the present embodiment, position information Pst contained in the reference image Ist as the metadata is set as a reference viewpoint position. The position information is represented by latitude and longitude. A range determined with respect to the reference viewpoint position Pst is set as a viewpoint range 50. The viewpoint range 50 thus set may be considered as an expanded area of the reference viewpoint position Pst.

Optionally, the captured image file having the position information matching the reference viewpoint position Pst may be used as a synthesis image candidate without setting the viewpoint range 50. In practice, however, images captured at the same position with some degree of capturing direction range are considered as being very few. In accordance with the present embodiment, the ease of acquisition of the captured image files serving as a synthesis image candidate is assured by setting the viewpoint range 50.

A line (image capturing direction line) extending from the reference viewpoint position Pst to the center position Cst of the reference image Ist plotted in the canvas 40, denoted by an arrow-headed line, corresponds to the direction information Dst contained in the reference image Ist as the metadata, i.e., the image capturing direction.

Figure 14B:
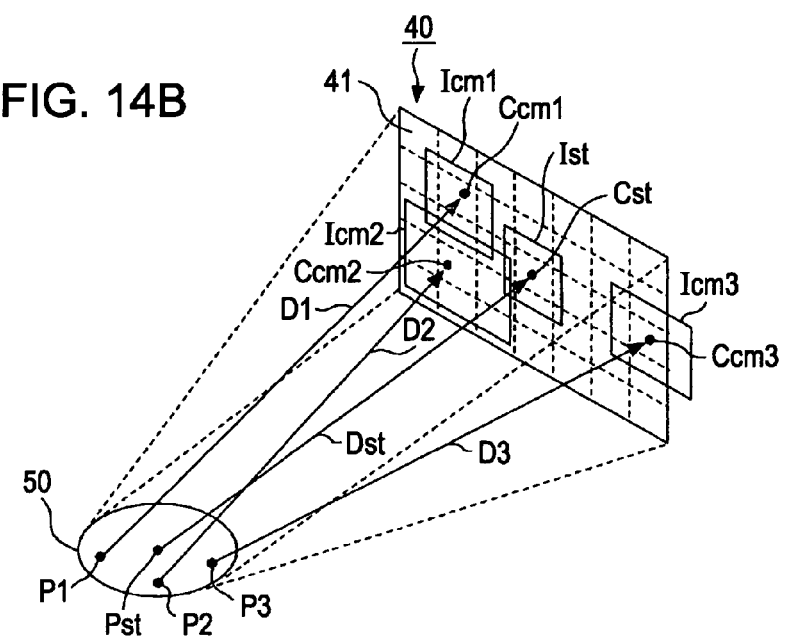

FIG. 14B corresponds to FIG. 13. More specifically, the synthesis images Icm1-Icm3 are plotted together with the reference image Ist on the canvas 40.

A viewpoint position P1 of the synthesis image Icm1 is present within the viewpoint range 50. The position information as the metadata contained in the captured image file as the synthesis image Icm1 is contained within the viewpoint range 50.

An arrow-headed line (capturing direction line) extending from the viewpoint position P1 to the center point Ccm1 of the synthesis image Icm1 in the canvas 40 indicates the capturing direction at the image capturing. More specifically, the captured image file as the synthesis image Icm1 represents direction information D1 as the metadata.

Similarly, viewpoint positions P2 and P3 of the synthesis images Icm2 and Icm3 are present within the viewpoint range 50. Arrow-headed lines extending from the viewpoint positions P2 and P3 to the center points Ccm2 and Ccm3 of the synthesis images Icm2 and Icm3 respectively represent direction information D2 and D3 as the metadata of the captured image files as the synthesis images Icm2 and Icm3.

The condition of the captured image file as a synthesis image Icm is that the captured image file contains the position information within the viewpoint range 50 and that the captured image file contains the direction information passing through a particular block formed in the canvas 40.

When collecting the synthesis image, the digital still camera 1 of the present embodiment searches for and collects a captured image file containing the position information and the direction information.

If the metadata of the captured image file contains information relating to subject distance, the subject distance information may be used in addition to the position information and direction information in the collection of the synthesis image. Based on the subject distance information, a synthesis image having a subject distance close to the reference image can be collected. In the image synthesis, images captured at approximately the same size can be collected. In the subject size adjustment illustrated in FIG. 11, an excessive degree of expansion or contraction may become unnecessary.

As previously discussed in the second display mode with reference to FIG. 12 and FIGS. 14A and 14B, the reference image and synthesis images are glued so that the center points of the images are plotted in blocks on the canvas. The images are then concatenated as illustrated in FIGS. 10B and 10C.

Control process of shifting the panorama image in the first display mode is described below. The shifting of the panorama image in the first display mode has previously discussed with reference to FIG. 8C.

Figure 15:
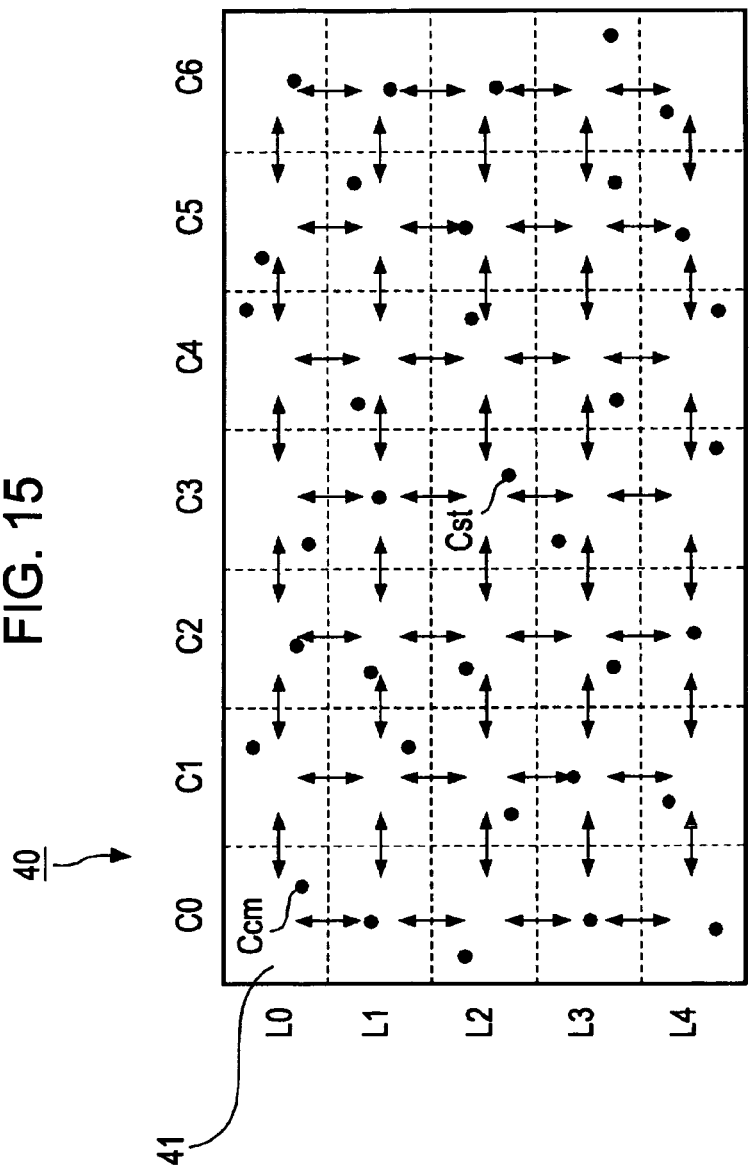
FIG. 15 illustrates the concept of shift control of the panorama image.

The center points Cst and Ccm are plotted in all the blocks 41 in the canvas 40 illustrated in FIG. 15. The display panorama image data generated as a result of plotting allows the panorama image to be displayed.

A "target block" is defined here. The target block is a block in which the center point of the image with the cursor CR placed thereon in the panorama image is plotted.

The target block may now be a block (L2,C3) corresponding to the reference image Ist. With this state, a left shift operation may be performed. In display control in response to the left shift operation, the target block is set to be a block (L2,C2) to the left of the block (L2,C3). When the target block is shifted, the cursor CR is placed on the image, the center point of which is plotted in the block (L2,C2) as a new target block. An effective image area of the display screen 23A is thus switched so that the image having the center point plotted in the block (L2,C2) is displayed in the frontmost position at the approximate center of the display screen 23A. When the shift instruction in the right, up, or down direction is issued, a block next to the target block in the specified direction is set as a new target block. The image plotted in the new target block is displayed in the frontmost position at the approximate center of the display screen 23A.

The shift operation of the panorama image in the first display mode is thus performed based on the block.

The display panorama image data in the second display mode is generated with the reference image Ist and the synthesis image Icm connected to each other. The shift operation may be performed in scroll display control in which the effective image area is shifted on the display screen 23A in response to the specified direction and an amount of shift.

Figure 16:
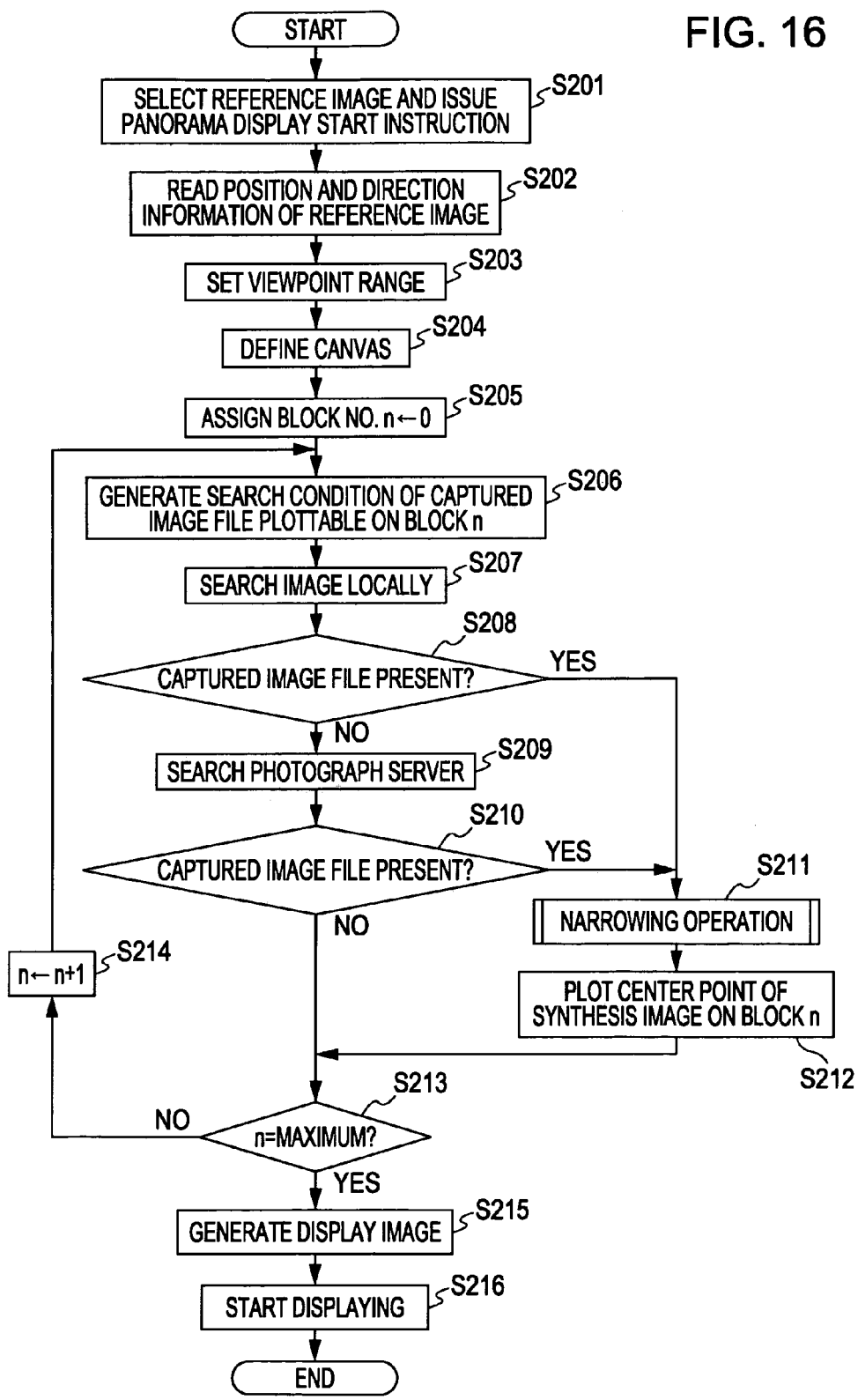
FIG. 16 is a flowchart illustrating a process starting with generating display panorama image data and ending with display starting of the panorama image.

Illustrated in a flowchart illustrated in FIG. 16 is a process in which the digital still camera 1 generates the display panorama image data and starts displaying the panorama image as illustrated in FIGS. 12 through 14A and 14B. The process is the one executed by the controller 17 (CPU) in the digital still camera 1 under the control of the computer program. In the discussion here, an entity executing each step of the process is the controller 17. The process steps here is to display the panorama image in the first display mode.

In step S201, the controller 17 receives the reference image Ist selected and entered in response to a user operation, and a display start instruction of the panorama image. Processing proceeds to step S202.

In step S202, the controller 17 reads and retrieves the position information Pst and the direction information Dst as the metadata of the captured image file as the selected reference image Ist.

In step S203, the viewpoint range 50 is set up (FIGS. 14A and 14B). The controller 17 sets a predetermined distance range arranged with respect to the position information (reference viewpoint position Pst) acquired as a reference point in step S202. This distance range serves as the viewpoint range 50. One of the simplest examples of the viewpoint range 50 is a circle having a predetermined radius and centered on the position represented by the direction information Pst. This is one example only. For example, the viewpoint range 50 may be an ellipse, a rectangle, or the like determined under a predetermined condition.

In step S204, the canvas 40 is defined. With reference to FIG. 12 and FIGS. 14A and 14B, the position through which the image capturing direction line determined by the reference viewpoint position Pst and the direction information Dst of the reference image Ist passes is set as a center position Cst. In this way, the positional relationship between the reference viewpoint position Pst and the canvas 40 is determined.

In step S205 and subsequent steps, the synthesis images Icm are plotted on the blocks 41 of the canvas 40.

In step S205 and subsequent steps, the blocks 41 in the canvas 40 are assigned respective numbers. The rule of numbering each block 41 is not limited to any particular one. In the canvas illustrated in FIG. 12, the blocks 41 are assigned numbers 0-34 as follows: the rightmost block to the leftmost block on the top row are numbered from 0 to 6 in that order, then the rightmost block to the leftmost block on the second row from the top are numbered from 7 to 13 in that order, and so on.

In step S205, "zero" is substituted for a variable n representing each block 41 as an initial value.

In step S206, a search condition of the captured image file having the center point Ccm plotted in the block having number n (block n) is generated.

The search condition is a combination of the position information and the direction information.

The position indicated by the position information falls within the viewpoint range 50 set in step S203. The direction information represents a direction range that allows the image capturing direction line extending from the viewpoint position P corresponding to the position information to pass through the area of the block n. The search condition results from AND gating the range of the position information and the range of the direction information. The range of the direction information is determined through a predetermined operation that is performed on the range of the position information corresponding to the viewpoint range 50 and direction information from the viewpoint range 50 (reference viewpoint position Pst) to the block n.

In step S207, the controller 17 searches the captured image files stored on the memory card 30 locally, i.e., in accordance with step (3-1) as illustrated in FIG. 3, for a combination of the position information and direction information satisfying the search condition generated in step S206.

In step S208, the controller 17 in response to the search results from step S207 determines whether there is a hit captured image file. If the answer to the determination in step S208 is affirmative, processing proceeds to step S211. If the answer to the determination in step S208 is non-affirmative, processing proceeds to step S209.

Proceeding to step S209 means that the captured image file plotted in the block n is not locally present. In step S209, the controller 17 searches the photograph server 2 in accordance with step (3-2) illustrated in FIG. 3.

The controller 17 controls the communication unit 27, thereby connecting the digital still camera 1 to the photograph server 2. The controller 17 converts the search condition generated in step S206 into the one in a format interpretable by the photograph server 2 as appropriate and then transmits the format converted search condition to the photograph server 2. In other words, the controller 17 requests the controller 17 to perform a search operation.

In response to the reception of the search request, the controller 44 in the photograph server 2 searches the storage 42 for the captured image file having the combination of the position information and direction information satisfying the search condition received together with the search request. If a captured image file satisfying the search condition is hit, the photograph server 2 transmits the hit captured image file to the digital still camera 1. If no such captured image file is hit, the photograph server 2 notifies the digital still camera 1 that there is no captured image file satisfying the search condition.

In step S210, the controller 17 determines in response to the response from the photograph server 2 whether a captured image file satisfying the search condition is hit. If the answer to the determination in step S210 is affirmative, processing proceeds to step S211. A non-affirmative answer, if obtained to the determination in step S210, means the captured image file plottable in the block n is present neither locally nor in the photograph server 2. In such a case, processing proceeds to step S213 with steps S211, and S212 skipped.

If the answer to the determination in step S208 or S210 is affirmative, processing proceeds to step S211.

Proceeding to step S211 means that there is a possibility that a plurality of hit captured image files are present. The number of center points, namely, the number of the captured image files, plottable in a single block 41 is only one. In step S211, the controller 17 performs a narrowing process to narrow the captured image files to the most appropriate one according to a criterion. The one captured image file remaining through the narrowing process becomes the synthesis image responsive to the block n.

In step S212, the controller 17 plots the center point of the synthesis image obtained in step S211 in the block n, and then proceeds to step S213.

In step S213, the block 0 through the block n have been plotted. If the answer to the determination in step S210 is non-affirmative, the controller 17 determines that there are no captured image files to be plotted. The plotting process thus ends.

In step S213, the controller 17 determines whether the variable n representing the block number is the maximum number. If the answer to the determination in step S213 is non-affirmative, there remains a block that has to undergo the plotting process. In step S214, the variable n is incremented, and processing returns to step S206.

If the answer to the determination in step S213 is affirmative, operations in steps S215 and S216 are executed.

In step S215, all the blocks 41 of the canvas 40 have undergone the plotting process. One piece of captured image data is assigned to each block.

In step S215, as previously discussed, the display panorama image data for a display in the first display mode is generated as previously discussed. In step S216, the panorama image is displayed on the display screen 23A based on the generated display panorama image data.

If processing proceeds from step S210 to step S211, the digital still camera 1 stores the data of the captured image file acquired from the photograph server 2. The captured image file acquired from the photograph server 2 may be stored on the RAM 19 and then deleted when the displaying of the panorama image is terminated. Alternatively, the captured image file may be stored on the memory card 30.

The narrowing process executed in step S211 illustrated in FIG. 16 is described with reference to a flowchart illustrated in FIG. 17.

Figure 17:
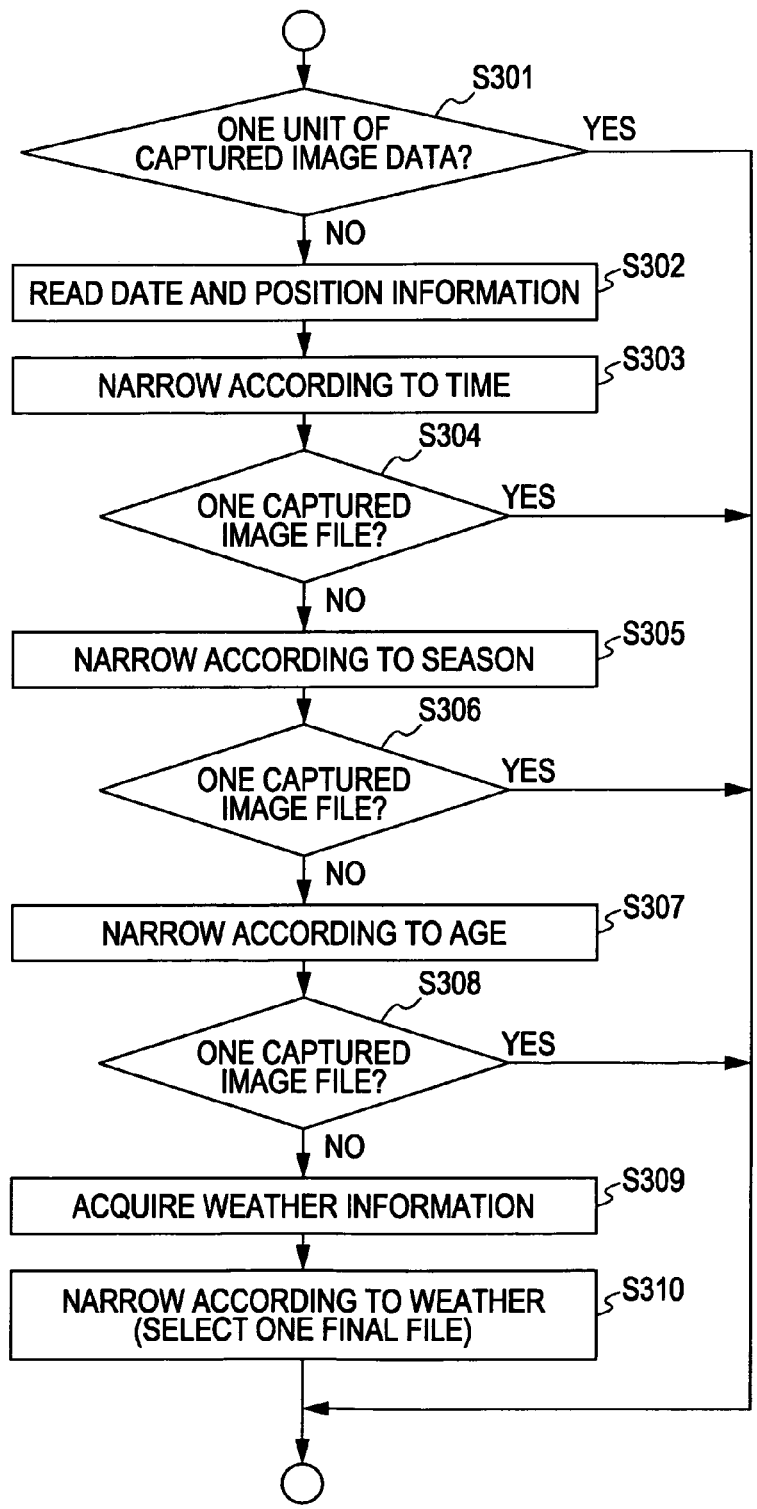
FIG. 17 is a flowchart illustrating a narrowing process of narrowing the captured image files serving as a candidate for a synthesis image.

Referring to FIG. 17, the controller 17 determines in step S301 whether the captured image data searched in step S207 or step S209 illustrated in FIG. 16 is one unit (one frame).

If the answer to the determination in step S301 is affirmative, one unit of captured image data is handled as a synthesis image. It is not necessary to perform the narrowing process. In such a case, processing proceeds to step S212 with steps S302-S310 skipped.

A non-affirmative answer, if obtained to the determination in step S301, means that a plurality of captured image files are hit. Processing proceeds to step S302.

In accordance with one embodiment of the present invention, it is important that a panorama image formed of the reference image and the synthesis image has a high level of realism. The synthesis image is preferably captured under an environment as close as possible to that of the reference image. If the environment of the synthesis image is similar to that of the reference image, the reference image and the synthesis image look similar to each other in terms of image capturing conditions such as color hue or the like, and it is easy to impart realism to the panorama image.

The narrowing process in step S302 is based on this reasoning as described below.

In step S302, date and time information representing the date and time of image capturing and recording is read and acquired as one piece of the metadata from the captured image files hit and the captured image file as the reference image. The date and time information is represented by the second, minute, hour, day, month and year.

In step S302, the metadata as the position information is read and acquired from the captured image files hit and the captured image file as the reference image. The position information is used in step S309.

In step S303, the narrowing process is performed in accordance with the information of time (minute and hour) in the date and time information acquired in step S302.

In the narrowing process, a captured image file having a smaller time difference to time of the reference image is extracted as a candidate.

For example, the time differences may be categorized according to "within 30 minutes," "within 1 hour," "within 3 hours," "within 6 hours," . . . . The captured image files are then sorted according these categories. A captured image file sorted into the smallest time difference category is extracted as a candidate.

There is a case in which the reference image is captured during daytime while the synthesis image is captured during nighttime. In such a case, images providing substantially different impressions are synthesized even if the images are close to each other in the image capturing position and direction.

If the narrowing process is performed according to time, the time of image capturing of the reference image becomes closer to the time of image capturing of the synthesis image. It is thus likely that a synthesis image captured in the same time band as the reference image is extracted. A similar sunlight condition or a similar lighting condition thus results.

In step S304, the controller 17 determines whether the number of captured image files narrowed in step S303 is one file only. If the answer to the determination in step S304 is affirmative, processing proceeds to step S212 with step S305 and subsequent steps skipped.

If the answer to the determination in step S304 is non-affirmative, processing proceeds to step S305.

In step S305, the narrowing process according to season is performed on a plurality of captured image files remaining as candidates through step S303.

Images captured even at the same position and direction are likely to be different if the season changes.

In step S305, an image file captured at the season close to the season at which the reference image is captured is extracted from the remaining candidates.

Information regarding the month in the date and time information acquired in step S302 is used. For example, March through May are set as the spring, June through August are set as the summer, September through November are set as the fall, and December through February are set as the winter. A captured image file having the same season as the reference image is set a new candidate. If there is no such file, a captured image file having the next season or the preceding season is searched for. In this way, the narrowing process is performed according to season.

In step S306, the controller 17 determines whether one captured image file remains as a candidate through the narrowing process in step S305. If the answer to the determination in step S306 is affirmative, processing proceeds to step S212. If the answer to the determination in step S306 is non-affirmative, processing proceeds to step S307.

In step S307, the narrowing process according to year is performed.

Images captured even at the same position and direction are likely to be different with ages. For example, buildings and environments change with age. Images captured in closer years serve more appropriately as synthesis images.

In step S307, a captured image file captured in a year closer to the year of the reference image is extracted as a candidate from the captured image files remaining through step S305.

Information regarding the year in the date and time information acquired in step S302 is used in the narrowing process according to year. Year differences from the year of the reference image are categorized, for example, "within 5 years," "within 10 years," "within 30 years," . . . . The captured image files are thus sorted as a candidate according the year difference categories. A captured image file sorted in the smallest year difference category is extracted as a candidate.

In step S308, the controller 17 determines whether one captured image file remains as a candidate through the narrowing process in step S307. If the answer to the determination in step S308 is affirmative, processing proceeds to step S212. If the answer to the determination in step S308 is non-affirmative, processing proceeds to step S309.

Steps S309 and S310 are related to the narrowing process according to weather.

If the weather at the image capturing of the reference image is different from the weather at the image capturing of the synthesis image, the panorama image may provide a different impression. If the weather at the image capturing of the reference image is fine, the synthesis image is preferably captured at fine weather in view of image consistency.

In step S309, weather information is acquired.

The controller 17 inquires, through the network 3 from a weather information server (not shown), weather at the reference image and at a plurality of captured image files currently remaining. In this enquiry, the date and time information and the position information is transmitted on a per image basis to the weather information server.

The weather information server searches for the weather recorded for an area indicated by the position information at the time and date indicated by the date and time information, and transmits the weather information regarding the hit weather to the digital still camera 1. The digital still camera 1 can thus acquire the weather information on a per image basis.

In step S310, the controller 17 extracts a captured image file having weather closer to the weather indicated by the reference image, based on the acquired weather information. If the weather information of the reference image indicates fine weather, a captured image file having fine weather is extracted. If no such file is present, a captured image file having slightly cloudy weather as closer to fine weather is extracted. If there is not any file having even slightly cloudy weather, a captured image file having rainy weather is extracted. In this way, a captured image file having weather closer to the weather of the reference image is extracted.

The narrowing process is completed with the one according to weather. If there still remain a plurality of captured image files through step S310, the captured image files are further narrowed to the most appropriate one according to a predetermined rule (for example, the captured image file having the closest date and time information is selected). The resulting file becomes a captured image file to be plotted in the block n, i.e., the synthesis image.

Processing proceeds to step S212 from step S310.

The narrowing process is performed according to parameters of time, season, year, and weather in that order. This is because the synthesis images are selected in the order of priority of time, season, year, and weather. The order of priority here is one example only. Another order of priority is also possible. The order of the parameters in the narrowing process may be appropriately modified. The parameters of time, season, year, and weather may be partly used.

The narrowing process illustrated in FIG. 17 is based on one idea and intended to acquire a synthesis image providing an impression as close as possible to that of the reference image.

In contrast, to enhance the quality of entertainment, a synthesis image providing a quite different impression than that of the reference image may be intentionally synthesized in order to allow the user to enjoy the panorama image from the standpoint of unusualness and unpredictability. Based on this idea, one algorithm is contemplated so that a captured image file to be selected as a candidate is as far as possible from the reference image in terms of at least one of the parameters of time, season, year, and weather.

Figure 18:
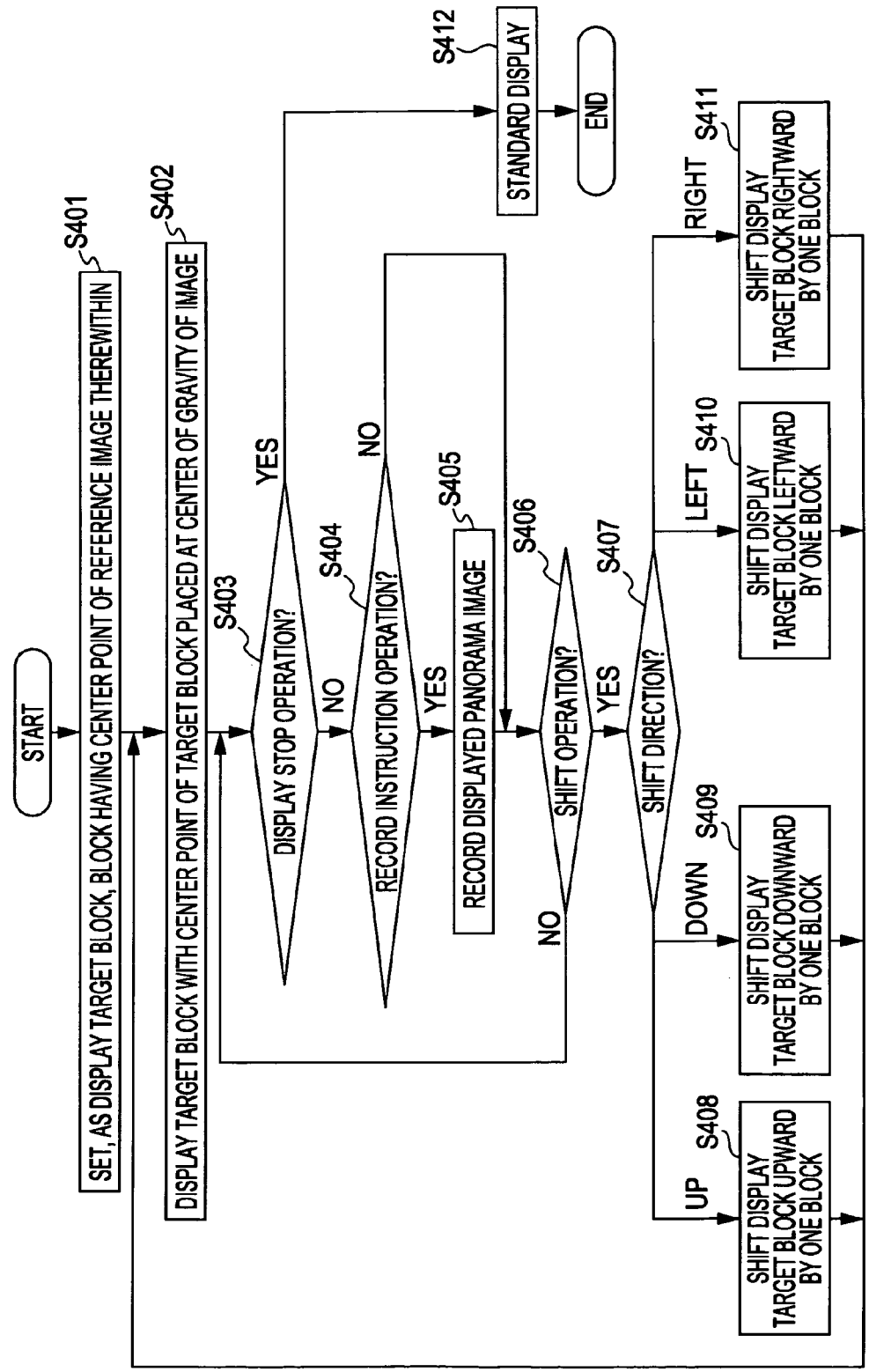
FIG. 18 is a flowchart illustrating a process of displaying and shifting the panorama image.

A flowchart illustrated in FIG. 18 represents a process of starting displaying the panorama image in step S216 in FIG. 16 and a display control process subsequent to the display start process.

Steps S401 and S402 correspond to the display start process in step S216.

In initial setting in step S401, the controller 17 sets as a display target block a block corresponding to the reference image on the canvas, namely, a block having therewithin a center point of the reference image.

In step S402, the controller 17 performs a control process to display as a main image the image having the center point thereof in the display target block.

More specifically, the image corresponding to the display target block is displayed at an approximate center and at the frontmost position of the display screen 23A. The cursor CR is placed and displayed on the image.

In the initial display, the reference image is mapped to the display target block and is displayed as the main image.

In step S403, the controller 17 determines whether an operation to stop displaying the panorama image has been issued. If the answer to the determination in step S403 is affirmative, processing proceeds to step S412. The controller 17 performs the display control process to switch from the panorama image display to a standard display. In the standard display, an image stored on the memory card 30 is reproduced as usual and displayed on the display screen 23A.

If the answer to the determination in step S403 is non-affirmative, processing proceeds to step S404.

In step S404, the controller 17 determines whether a record instruction has been issued. The record instruction may be issued when a shutter key is selected during the displaying of the panorama image or when an operation to record is performed by calling a menu screen on the display screen 23A during the displaying of the panorama image.

If the answer to the determination in step S404 is non-affirmative with no record instruction issued, processing proceeds to step S406 with step S405 skipped.

If the answer to the determination in step S404 is affirmative with the record instruction issued, the operation in step S405 is executed. Processing proceeds to step S406.

In step S405, the panorama image displayed on the display screen 23A in response to the record instruction is stored on the memory card 30 as one captured image file.

In accordance with the present embodiment, the user may find an image of interest when the user displays the panorama image with the displaying and shift operations in progress. The user then performs the record instruction operation to store that image onto the memory card 30 like another captured image file. The user not only can view the panorama image but also can record the image. The quality of entertainment is thus enhanced.

In step S406, the controller 17 determines whether a shift operation of the panorama image has been performed. If the answer to the determination in step S406 is affirmative, processing returns to step S403.

If the answer to the determination in step S404 is non-affirmative, processing proceeds to step S407.

In step S407, the controller 17 determines whether the shift direction is one of the up, down, left, and right directions.

If it is determined in step S407 that the shift direction is up, processing proceeds to step S408. A block immediately above a block heretofore set to be the display target block is set to be a new display target block. The display target block is thus moved to the immediately upward block. Processing returns to step S402. As the panorama image, the image immediately above the image having served heretofore as the main image is now displayed as a new main image.

If it is determined in step S407 that the shift direction is down, processing proceeds to step S409. The display target block is thus moved to the immediately downward block. Processing returns to step S402.

Similarly, if it is determined in step S407 that the shift direction is left, processing proceeds to step S410. The display target block is thus moved to the immediately left block. Processing returns to step S402.

If it is determined in step S407 that the shift direction is right, processing proceeds to step S411. The display target block is thus moved to the immediately right block. Processing returns to step S402.

If the display target block is the topmost block, the bottommost block, the leftmost block, or the rightmost block in steps S408-S411 with no further shifting allowed, processing returns to step S402 without moving the display target block.

The processes discussed with reference to the flowcharts illustrated in FIGS. 5, and 16-18 are executed when the controller 17 in the digital still camera 1 executes the program.

Such a program may be stored on an ROM or a flash memory used as a memory by the controller 17 as the CPU at the manufacturing phase of the digital still camera 1. The program may be stored on a removable recording medium and then installed onto the flash memory. The program may be installed via a predetermined data interface under the control of another host apparatus. The program may be stored on a storage in a server over a network and then downloaded for installation from the server to the digital still camera 1 having a network function.

Figure 19B:
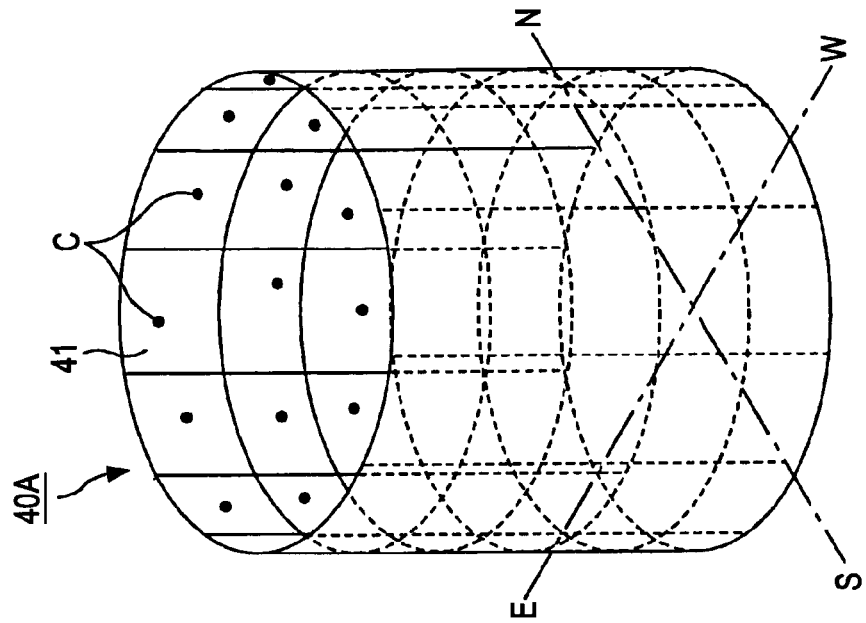
FIGS. 19A and 19B illustrate a first modification of the present embodiment.

A first modification of the embodiment is described below with reference to FIGS. 19A and 19B.

The canvas 40 illustrated in FIG. 12 has a two-dimensional surface. In accordance with the first modification of the embodiment, a cylindrical canvas 40A is defined as illustrated in FIGS. 19A and 19B.

The cylindrical canvas 40A as shown has blocks 41 on the inner surface thereof. The blocks 41 on the cylindrical canvas 40A have the absolute North, East, West and South relationship.

Figure 19A:
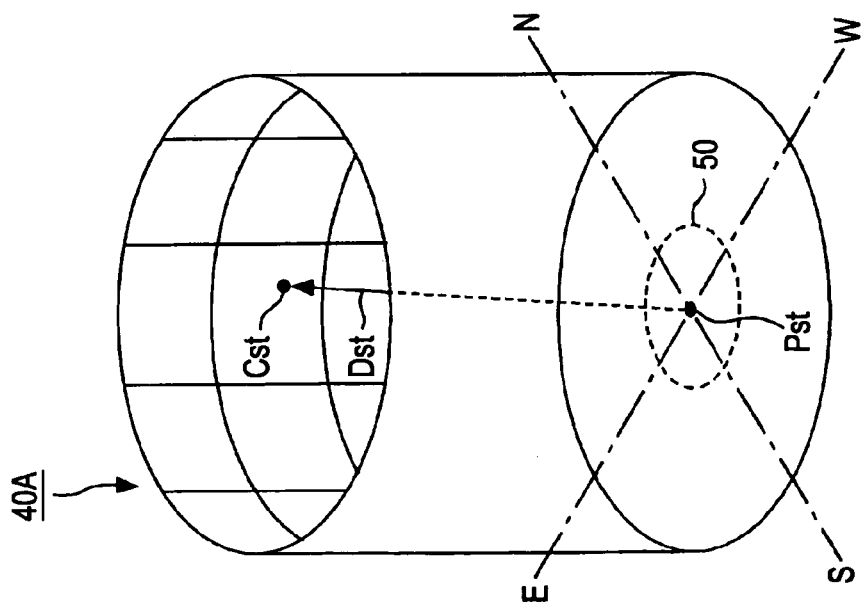

Referring to FIG. 19A, the viewpoint position P on the cylindrical canvas 40A is set up on the bottom inner surface of the cylindrical canvas 40A. The reference viewpoint position Pst is arranged at the center of the bottom circular surface.

The center points of the reference image and the synthesis image may be plotted on the blocks 41 as illustrated in FIG. 12 through FIGS. 14A and 14B. FIG. 19B illustrates the center points plotted onto the blocks.

The panorama image generated based on the thus generated cylindrical canvas 40A can be displayed over 360° around the viewpoint at which the reference image is captured.

Figure 20:
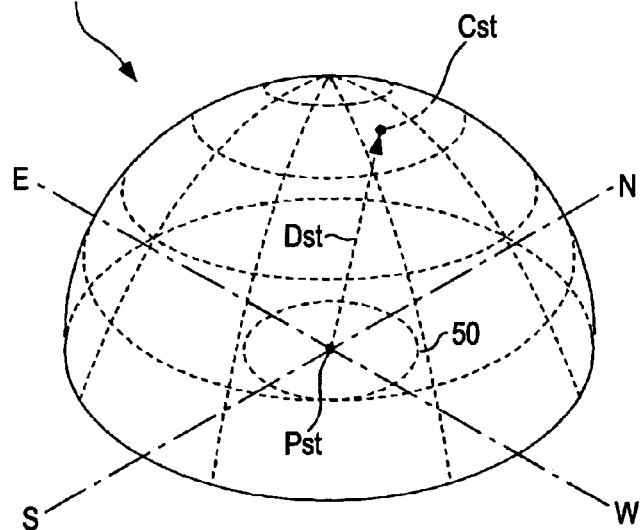
FIG. 20 illustrates a second modification of the present embodiment.

FIG. 20 illustrates a second modification of the embodiment of the present invention.

In the second modification, a dome-type canvass 40B is defined.

The viewpoint position P in the dome-type canvass 40B is set up in the bottom of the dome. For example, the reference viewpoint position Pst is set at the center point of the circular dome bottom.

In this case as well, the center points of the images are plotted in the same manner as described with reference to FIG. 12 through FIGS. 14A and 14B.

The panorama image thus constructed is displayed so that the images are continuously connected in the ceiling or in the sky.

Figure 21:
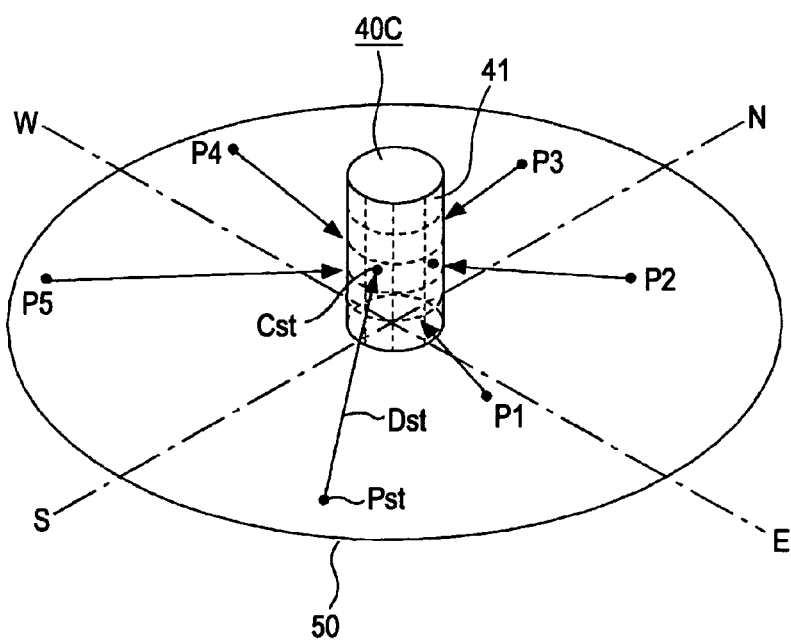
FIG. 21 illustrates a third modification of the present embodiment.

FIG. 21 illustrates a third modification of the embodiment of the present invention.

In the third modification, a cylindrical canvass 40C is defined. The cylindrical canvass 40C is identical to the cylindrical canvas 40A in terms of cylindrical shape. The blocks 41 however are set up on the outer surface rather than on the inner surface of the cylindrical canvass 40C.

The reference viewpoint position Pst is set up outside the cylindrical canvass 40C. Plotting is performed from the reference viewpoint position Pst to one block in accordance with the direction information Dst of the reference image.

For example, the viewpoint range 50 with the cylindrical canvas 40A placed at the center thereof is set up to have a predetermined area containing the reference viewpoint position Pst.

The center point of the synthesis image is plotted in the cylindrical canvas 40A. The viewpoint position is within the viewpoint range 50, and a captured image file having the direction information allowing a line to extend from the viewpoint position to a block in the cylindrical canvas 40A is extracted as a synthesis image.

In the panorama image displayed on the cylindrical canvass 40C, the same one subject can be viewed in a scroll operation with the viewpoint rotating within a range of 360°.

Another panorama image (not shown) can also be contemplated as a modification.

The reference image is selected and the panorama image is displayed on the display screen 23A. If a right or left shift operation is performed in this state, an image can be viewed within a range of 360° with respect to the reference viewpoint position at which the reference image is captured. The shift operation may be performed so that a forward shift in the current direction of the viewpoint is made. In response to the shift operation, the viewpoint position also moves. If a left or right shift operation is performed with respect to the viewpoint position, an image within a range of 360° can be viewed from the moved viewpoint position. Similarly, if the viewpoint position is moved forward in the current direction, an image within a range of 360° can be viewed from the moved viewpoint position.

In response to the shift operation of the viewpoint, the viewpoint position is changed, and the plotting operation is performed on the cylindrical canvas 40A with respect to the changed viewpoint position.

In accordance with the above-described embodiments, the digital still camera 1 displays the panorama image. The present invention is applicable to a video camera that records a captured image as a still image. A program implementing the above-described process steps may be installed on a personal computer. Such a program may be supplied as a photo viewer as application software.

In the above-referenced embodiments, the generation of the panorama image is initiated in response to an instruction to display the panorama image triggered by the user. The present invention is not limited to this method. For example, the panorama image may be automatically generated by an imaging device.

The digital still camera of each of the embodiments of the present invention may be left on a cradle in a power-feed ready state. The panorama image may be automatically generated with some or all of the captured image files stored on the memory card used as reference images.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    viewpoint range setting means for setting a viewpoint range based on position information of reference image data selected as a reference image from captured image data, the captured image data containing, for each captured image, at least position information representing a capturing position and direction information representing a capturing direction attached thereto as additional information;
    synthesis image data acquisition means for acquiring synthesis image data from the captured image data, the position information and the direction information of the synthesis image data satisfying the conditions that an image outside an imaging frame of the reference image data is captured and that the capturing position is within the viewpoint range;
    display image generating means for generating display image data by placing a reference image from the reference image data and a synthesis image from the synthesis image data at positions set in accordance with the position information and the direction information for each of the reference image and synthesis image; and
    display control means for causing a partial area of the display image data to be displayed on a display screen and causing the partial area of the display image data displayed heretofore to be modified in response to a shift direction specified in a shift instruction of a display area,
    further comprising virtual image placement surface setting means for setting a virtual image placement surface, the virtual image placement surface being used to set a synthesis position of the reference image and the synthesis image, the entire virtual image placement surface being partitioned into placement areas respectively bearing images thereon, a reference placement area from the placement areas defined as a reference containing a center point, and a line of capturing direction determined by the position information and the direction information of the reference image data passing through the center point, wherein the synthesis image data acquisition means acquires the synthesis image data having the position information and the direction information determining the center point, the center point placed in each of the placement areas other than the reference placement area, and wherein the display image generating means sets the synthesis position of the reference image so that the center point of the reference image data is placed in the reference placement area of the virtual image placement surface, and sets the synthesis position of the synthesis image so that the center point of the synthesis image data acquired by the synthesis image data acquisition means is placed in each of the placement areas other than the reference placement area, and the display image generating means synthesizes the reference image and the synthesis images with the synthesis positions thereof set to generate a display image.

2. The image processing apparatus according to claim 1, wherein the display control means causes an image placed on a display target placement area being the placement area as a display target to be displayed as a main image on the partial area, and the image to move within the display target placement area in response to the shift instruction.

* * * * *